(12) United States Patent
Nagano et al.

(10) Patent No.: US 12,554,317 B2
(45) Date of Patent: Feb. 17, 2026

(54) INFORMATION PROCESSING DEVICE AND INFORMATION PROCESSING METHOD

(71) Applicant: Sony Group Corporation, Tokyo (JP)

(72) Inventors: Keijiroh Nagano, Tokyo (JP); Tsuyoshi Ishikawa, Kanagawa (JP); Shin Shiroma, Tokyo (JP); Takuya Ikeda, Tokyo (JP); Ikuo Yamano, Tokyo (JP); Kei Takahashi, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 18/730,320

(22) PCT Filed: Jan. 26, 2023

(86) PCT No.: PCT/JP2023/002383
§ 371 (c)(1),
(2) Date: Jul. 19, 2024

(87) PCT Pub. No.: WO2023/153220
PCT Pub. Date: Aug. 17, 2023

(65) Prior Publication Data
US 2025/0130625 A1    Apr. 24, 2025

(30) Foreign Application Priority Data
Feb. 9, 2022 (JP) ................................ 2022-018456

(51) Int. Cl.
*G06F 3/01* (2006.01)
(52) U.S. Cl.
CPC .................................. *G06F 3/011* (2013.01)

(58) Field of Classification Search
CPC ........ G06F 3/011; G06F 3/012; G06F 3/0304; G06F 3/0346; G06F 3/04845; G06F 3/017; G06F 3/04842
See application file for complete search history.

(56) References Cited

U.S. PATENT DOCUMENTS 8,558,759 B1 * 10/2013 Prada Gomez ......... G06F 3/017
345/619
2013/0335303 A1 * 12/2013 Maciocci ............. G02B 27/017
345/8

(Continued)

FOREIGN PATENT DOCUMENTS

| JP | 2002-042172 A | 2/2002 |
|---|---|---|
| JP | 2018-045338 A | 3/2018 |

(Continued)

*Primary Examiner* — Grant Sitta
(74) *Attorney, Agent, or Firm* — Paratus Law Group, PLLC

(57) ABSTRACT

There is provided an information processing device and an information processing method that facilitate designating a desired range in an object in XR. The information processing device includes: an object recognition unit that recognizes a state of a target object that is a real object or a virtual object that exists in a field of view of a user; an operation body recognition unit that recognizes a state of an operation body that is a real object or a virtual object used by the user for setting a designated range for the target object; and a designated range setting unit that sets the designated range on a basis of at least one of a state of the target object or a state of the operation body. The present technology can be applied to, for example, a head mount display (HMD).

23 Claims, 23 Drawing Sheets

(56) References Cited

U.S. PATENT DOCUMENTS

| | | | | |
|---|---|---|---|---|
| 2015/0058723 A1* | 2/2015 | Cieplinski | ............ | G06F 3/04847 |
| | | | | 715/702 |
| 2015/0234567 A1* | 8/2015 | Wakatsuki | .......... | G06F 3/04842 |
| | | | | 715/852 |
| 2017/0090725 A1* | 3/2017 | Jansky | ................ | G06F 3/04883 |
| 2018/0046359 A1* | 2/2018 | Kim | ...................... | G06F 3/0488 |
| 2018/0158243 A1* | 6/2018 | Gleason | ................ | G06T 19/006 |
| 2019/0057531 A1 | 2/2019 | Sareen | | |
| 2019/0362557 A1* | 11/2019 | Lacey | ........................ | G06T 5/20 |
| 2022/0113842 A1* | 4/2022 | Kim | .................... | H04M 1/0268 |

FOREIGN PATENT DOCUMENTS

| | | |
|---|---|---|
| JP | 2018-081694 A | 5/2018 |
| JP | 2021-009552 A | 1/2021 |
| WO | WO-2020195292 A1 | 10/2020 |

\* cited by examiner

A

B

A

B

INFORMATION PROCESSING DEVICE AND INFORMATION PROCESSING METHOD

CROSS REFERENCE TO PRIOR APPLICATION

This application is a National Stage Patent Application of PCT International Patent Application No. PCT/JP2023/002383 (filed on Jan. 26, 2023) under 35 U.S.C. § 371, which claims priority to Japanese Patent Application No. 2022-018456 (filed on Feb. 9, 2022), which are all hereby incorporated by reference in their entirety.

TECHNICAL FIELD

The present technology relates to an information processing device and an information processing method, and particularly relates to an information processing device and an information processing method that facilitate designating a range in an object in cross reality (XR).

BACKGROUND ART

In recent years, with the spread of XR such as virtual reality (VR), augmented reality (AR), mixed reality (MR), and the like, a method for facilitating selecting a desired object from a plurality of objects has been studied (see, for example, Patent Document 1).

CITATION LIST

Patent Document

Patent Document 1: Japanese Patent Application Laid-Open No. 2018-45338

SUMMARY OF THE INVENTION

Problems to be Solved by the Invention

On the other hand, there is a need to facilitate designating a desired range in an object for XR. For example, there is a need to designate the entire object or designate any portion of the object by a simple operation.

The present technology has been made in view of such a situation, and facilitates designating a desired range in an object in XR.

Solutions to Problems

An information processing device of one aspect of the present technology includes: an object recognition unit that recognizes a state of a target object that is a real object or a virtual object that exists in a field of view of a user; an operation body recognition unit that recognizes a state of an operation body that is a real object or a virtual object used by the user for setting a designated range for the target object; and a designated range setting unit that sets the designated range on a basis of at least one of a state of the target object or a state of the operation body.

An information processing method of one aspect of the present technology performed by an information processing device, includes: recognizing a state of a target object that is a real object or a virtual object that exists in a field of view of a user; recognizing a state of an operation body that is a real object or a virtual object used by the user for setting a designated range for the target object; and setting the designated range on a basis of at least one of a state of the target object or a state of the operation body.

In one aspect of the present technology, a state of a target object that is a real object or a virtual object that exists in a field of view of a user is recognized; a state of an operation body that is a real object or a virtual object used by the user for setting a designated range for the target object is recognized; and the designated range is set on a basis of at least one of a state of the target object or a state of the operation body.

MODE FOR CARRYING OUT THE INVENTION

Hereinafter, modes for carrying out the present technology will be described. The description will be given in the following order.
1. First Embodiment
2. Second Embodiment
3. Modification
4. Others 1. First Embodiment First, a first embodiment of the present technology will be described with reference to FIGS. 1 to 21.
<Configuration Example of Information Processing Device 1>

Figure 1:
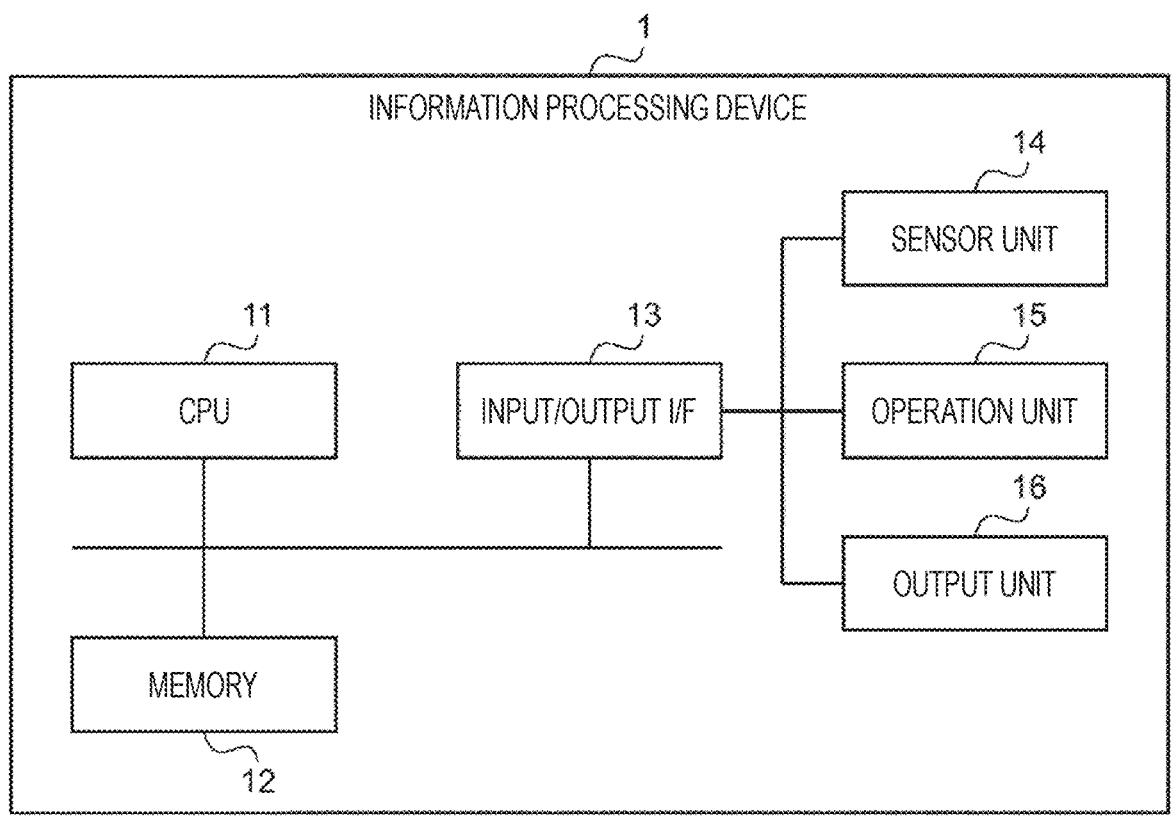
FIG. 1 is a block diagram illustrating a configuration example of an information processing device to which the present technology is applied.

FIG. 1 illustrates a configuration example of an information processing device 1 to which the present technology is applied.

The information processing device 1 includes, for example, a head mount display (HMD), is mounted on the head of the user, and implements XR such as VR, AR, or MR.

The information processing device 1 includes a central processing unit (CPU) 11, a memory 12, an input/output interface (I/F) 13, a sensor unit 14, an operation unit 15, and an output unit 16. The CPU 11, the memory 12, and the input/output I/F 13 are connected to each other via a bus. The sensor unit 14, the operation unit 15, and the output unit 16 are connected to the input/output I/F 13.

The CPU 11 executes various types of processing of the information processing device 1 and controls each unit.

The memory 12 includes a nonvolatile memory and a volatile memory, and stores data, programs, and the like necessary for processing of the information processing device 1.

The input/output I/F 13 is an interface that connects various devices and inputs and outputs data and the like between the CPU 11 and the memory 12 and various devices.

The sensor unit 14 includes various sensors used for detecting the state of the information processing device 1, the state of the user, the peripheral state of the information processing device 1, and the like. The sensor unit 14 supplies sensor data indicating detection result of the respective sensors to the CPU 11 via the input/output I/F 13 and the bus.

The operation unit 15 includes an operation device used for operating the information processing device 1. For example, the operation unit 15 includes an operation device used for operating a power source of the information processing device 1 and various settings of the information processing device 1. For example, the operation unit 15 includes an operation device used for an operation for an object that exists in reality (hereinafter, referred to as real object) or a virtual object displayed in the field of view of the user (hereinafter, referred to as virtual object).

Note that the virtual object includes, for example, an object virtually representing a real object, an object indicating information regarding a real object or another virtual object, and an object for a user operation. The object for user operation includes, for example, a hand, a button, a switch, a cursor, a menu screen, and the like virtually displayed in the field of view of the user.

Figure 2:
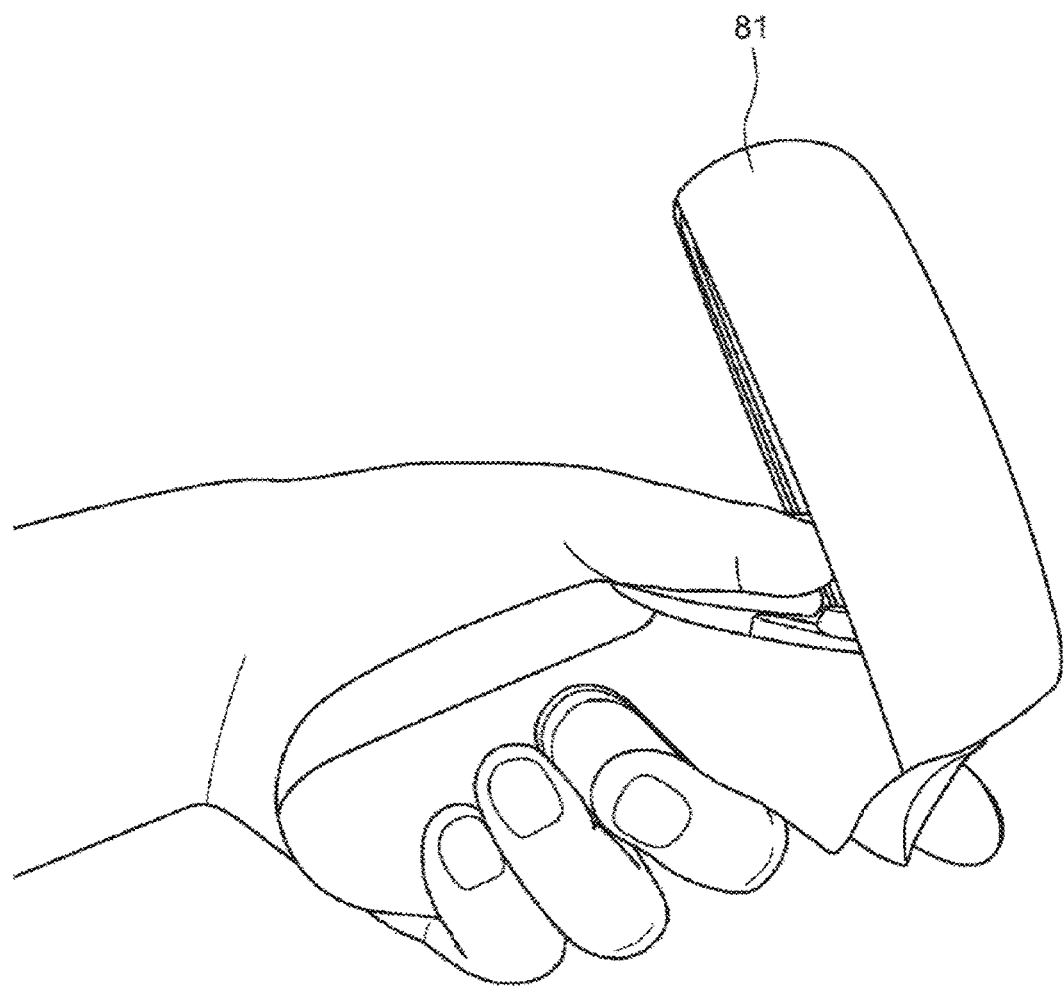
FIG. 2 is a diagram illustrating a configuration example of an appearance of an operation device.

FIG. 2 illustrates a configuration example of an appearance of an operation device 81 that is an example of the operation device included in the operation unit 15. The operation device 81 is operated, for example, by being held in both hands by the user. For example, by the user moving a hand holding the operation device 81, a virtual hand displayed in the field of view of the user moves similarly to the hand of the user.

The operation unit 15 supplies operation data corresponding to operation content for each operation device to the CPU 11 via the input/output I/F 13 and the bus.

The output unit 16 includes a device that outputs video, sound, and haptic information (for example, vibration or the like).

For example, the output unit 16 includes a display device that projects video and forms an image in the field of view of the user to display the image in the field of view of the user. A method of the display device may be any method. For example, the display method of the display device may be any of a non-transmissive type, a video transmissive type, and an optical transmissive type. For example, the projection method of the display device may be either a virtual image projection type or a retinal projection type.

For example, the output unit 16 includes a display device (for example, projector) that implements projection mapping for projecting video onto a real object or a real space.

For example, the output unit 16 includes at least one audio output device among a speaker, a headphone, and an earphone.

For example, the output unit 16 includes a haptics device that transmits haptic information such as vibration to the user. The haptics device is included, for example, in at least one of the main body of the information processing device 1 worn on the head of the user or the operation device included in the operation unit 15.
<Configuration Example of Sensor Unit 14 and Information Processing Unit 51>

Figure 3:
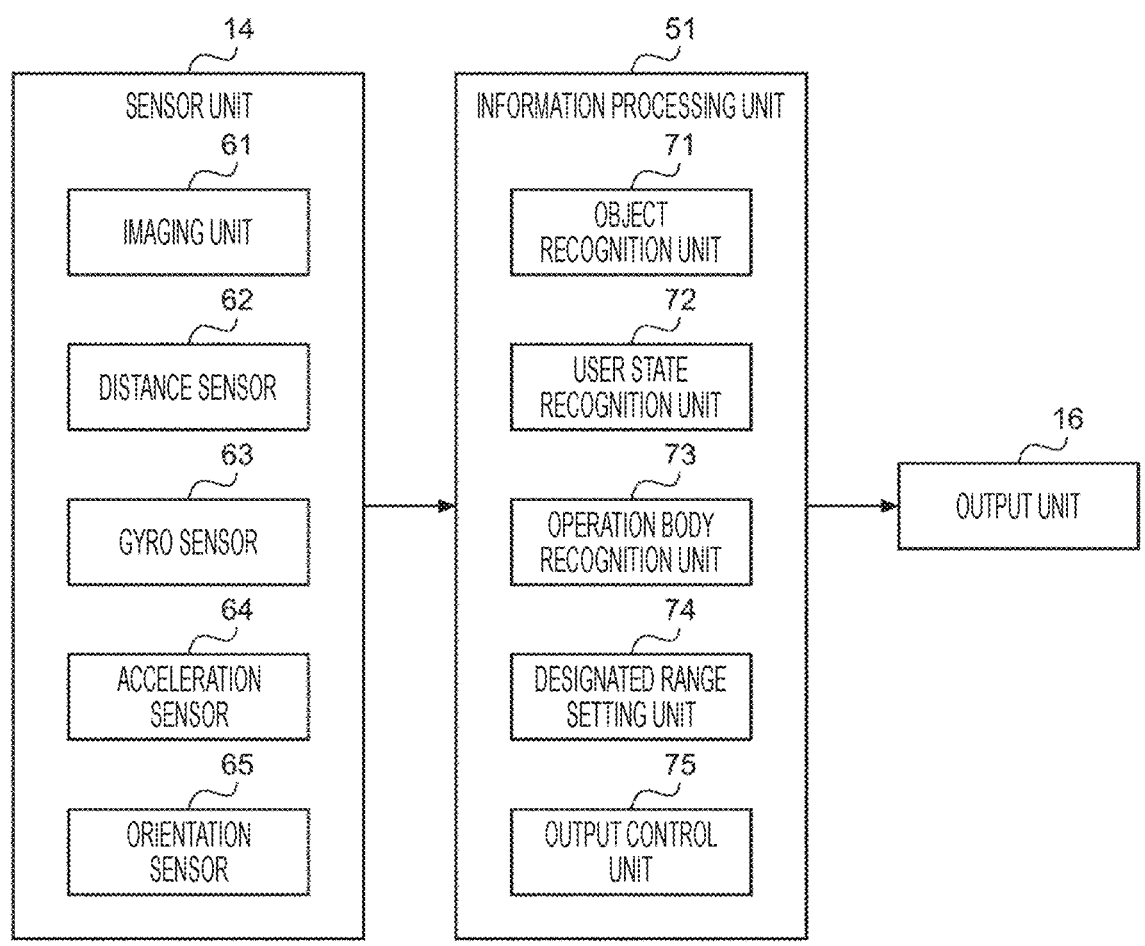
FIG. 3 is a block diagram illustrating a configuration example of a sensor unit and an information processing unit.

FIG. 3 illustrates a configuration example of the sensor unit 14 and an information processing unit 51 in FIG. 1. The information processing unit 51 is implemented, for example, by the CPU 11 in FIG. 1 executing a predetermined program.

Note that, in FIG. 3, the input/output I/F 13 and the bus are not illustrated.

The sensor unit 14 includes an imaging unit 61, a distance sensor 62, a gyro sensor 63, an acceleration sensor 64, and an orientation sensor 65.

The imaging unit 61 includes, for example, a camera (hereinafter, referred to as peripheral camera) that images the surroundings of the information processing device 1 (for example, line-of-sight direction of the user). The peripheral camera supplies data (hereinafter, referred to as imaged image data) indicating an obtained imaged image (hereinafter, referred to as peripheral image) to the information processing unit 51.

Furthermore, the imaging unit 61 includes, for example, a camera (hereinafter, referred to as user camera) that images the user. The user camera supplies data (hereinafter, referred to as user image data) indicating an obtained imaged image (hereinafter, referred to as user image) to the information processing unit 51.

The distance sensor 62 is included, for example, in at least one of the main body of the information processing device 1 or the operation device included in the operation unit 15, and detects the distance between the main body or the operation device and a real object. The distance sensor 62, for example, includes a depth camera or the like, but the method and the type of the distance sensor 62 are not particularly limited thereto. The distance sensor 62 supplies distance data indicating a distance detection result to the information processing unit 51.

The gyro sensor 63 is included, for example, in at least one of the main body of the information processing device 1 or the operation device included in the operation unit 15, and detects an angular velocity of the main body or the operation device. The gyro sensor 63 supplies data (hereinafter referred to as angular velocity data) indicating a detection result to the information processing unit 51.

The acceleration sensor 64 is included, for example, in at least one of the main body of the information processing device 1 or the operation device included in the operation unit 15, and detects acceleration of the main body or the operation device. The acceleration sensor 64 supplies data (hereinafter referred to as acceleration data) indicating a detection result to the information processing unit 51.

The orientation sensor 65 is included, for example, in at least one of the main body of the information processing device 1 or the operation device included in the operation unit 15, and detects the orientation of the main body or the operation device. The orientation sensor 65 supplies data (hereinafter referred to as orientation data) indicating a detection result to the information processing unit 51.

The information processing unit 51 includes an object recognition unit 71, a user state recognition unit 72, an operation body recognition unit 73, a designated range setting unit 74, and an output control unit 75.

The object recognition unit 71 executes object recognition processing.

For example, the object recognition unit 71 executes recognition processing of a real object on the basis of sensor data from the sensor unit 14, and recognizes the position, posture, shape, type, feature, motion, and the like of the real object. Furthermore, for example, the object recognition unit 71 recognizes the position, posture, shape, feature, motion, and the like of each portion in each real object as necessary.

This real object may include a part of the body (for example, hand, finger, or the like) of the user.

For example, the object recognition unit 71 executes recognition processing of a virtual object on the basis of display control information of the virtual object from the output control unit 75, and recognizes the position, posture, shape, type, feature, motion, and the like of the virtual object. Furthermore, for example, the object recognition unit 71 recognizes the position, posture, shape, feature, motion, and the like of each portion in each virtual object as necessary.

The user state recognition unit 72 executes recognition processing of the state of the user on the basis of sensor data from the sensor unit 14 and a recognition result of the object recognition unit 71. For example, the user state recognition unit 72 recognizes the position and posture of the head of the user, the line-of-sight direction, the position and posture of the hand or the finger, and the like.

The operation body recognition unit 73 executes recognition processing of the operation body on the basis of a recognition result of the object recognition unit 71 and a recognition result of the user state recognition unit 72.

Here, the operation body is a real object or a virtual object at least used by the user for setting a designated range for a real object or a virtual object (hereinafter, referred to as target object) as a target for setting the designated range. The designated range is a range in the target object designated by the user using the operation body. The designated range may be the entire target object or a part of the target object.

For example, the operation body recognition unit 73 recognizes the position, posture, shape, motion, and the like of the operation body including a real object on the basis of a recognition result of the real object by the object recognition unit 71 and a recognition result of the user state recognition unit 72.

This real object includes, for example, a part of the body (for example, hand, finger, or the like) of the user. That is, a part of the body of the user can be the operation body.

For example, the operation body recognition unit 73 recognizes the position, posture, shape, motion, and the like of the operation body including a virtual object on the basis of a recognition result of the virtual object by the object recognition unit 71.

The virtual object includes, for example, an operation object that can be operated in the virtual world by the user using a hand or the operation device. For example, an operation object or the like that simulates a hand of the user or a hand moving in the virtual world in synchronization with the motion of the operation device is included.

For example, the operation body recognition unit 73 recognizes the position, posture, shape, motion, and the like of the operation body including the operation device on the basis of operation data from the operation unit 15.

The designated range setting unit 74 sets the designated range for a target object on the basis of a recognition result of the target object by the object recognition unit 71 and a recognition result of the operation body by the operation body recognition unit 73.

The output control unit 75 controls output of video, sound, and contact information from the output unit 16 on the basis of sensor data from the sensor unit 14, a recognition result of an object by the object recognition unit 71, a recognition result of the state of the user by the user state recognition unit 72, a recognition result of the operation body by the operation body recognition unit 73, a designated range set by the designated range setting unit 74, and operation data from the operation unit 15. For example, the output control unit 75 controls display of a virtual object by supplying display control information of the virtual object to the output unit 16.

<Designated Range Setting Processing>

Figure 4:
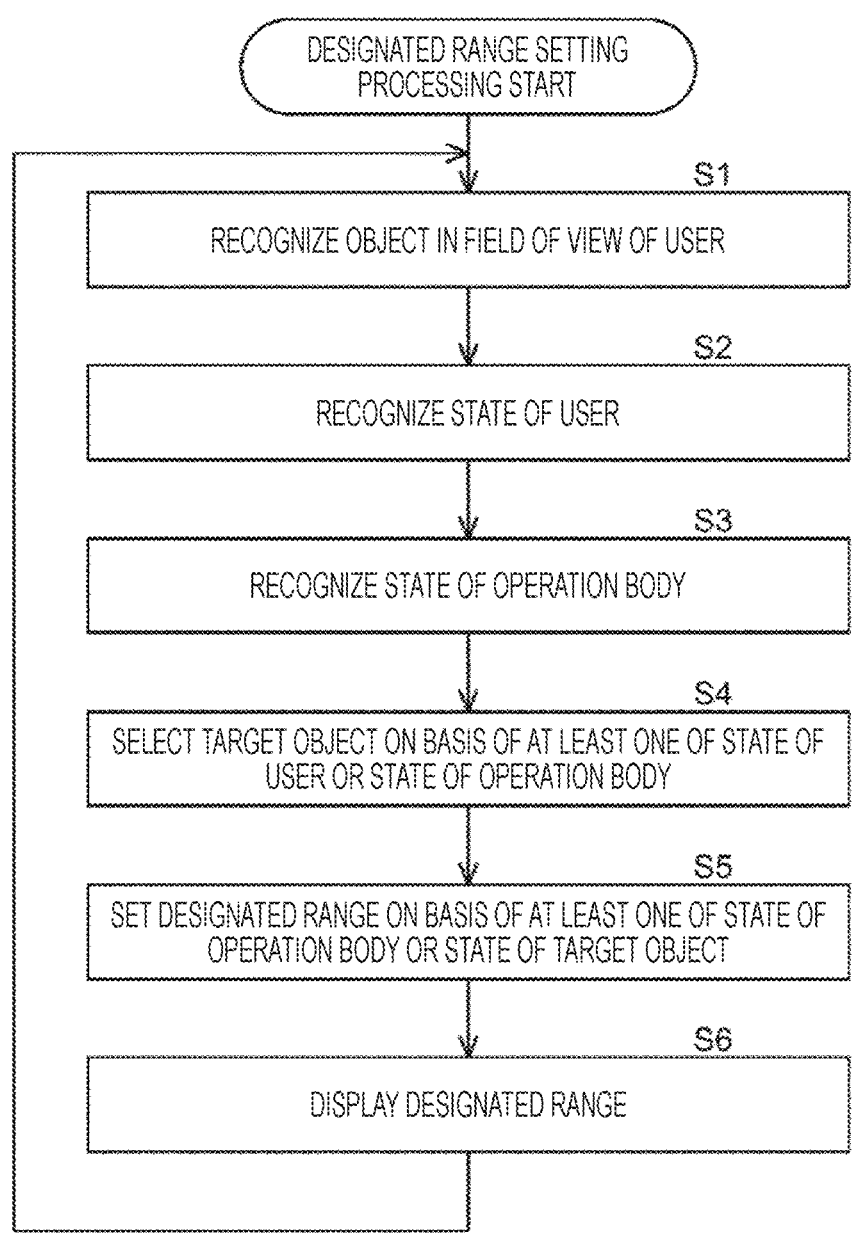
FIG. 4 is a flowchart for describing designated range setting processing.

Next, designated range setting processing executed by the information processing device 1 will be described with reference to a flowchart of FIG. 4.

This processing starts, for example, when power of the information processing device 1 is turned on, and ends when the power is turned off.

In step S1, the object recognition unit 71 recognizes an object in the field of view of the user.

For example, the object recognition unit 71 recognizes a real object that exists in the field of view of the user on the basis of peripheral image data supplied from the imaging unit 61. For example, the object recognition unit 71 recognizes the position, posture, shape, type, feature, motion, and the like of the real object in the field of view of the user.

For example, the object recognition unit 71 recognizes a virtual object displayed in the field of view of the user on the basis of display control information of the virtual object from the output control unit 75. For example, the object recognition unit 71 recognizes the position, posture, shape, type, feature, motion, and the like of the virtual object in the field of view of the user.

In step S2, the user state recognition unit 72 recognizes the state of the user. For example, the user state recognition unit 72 recognizes the position and posture of the head of the user using a technology such as visual simultaneous localization and mapping (SLAM) on the basis of sensor data from each of the sensors of the sensor unit 14. For example, the user state recognition unit 72 performs bone detection on the basis of peripheral image data and a recognition result of the object recognition unit 71, and recognizes the position, posture, shape, motion, and the like of a hand or finger of the user. For example, the user state recognition unit 72 recognizes the line-of-sight direction of the user on the basis of user image data.

In step S3, the operation body recognition unit 73 recognizes the state of the operation body.

For example, in a case where the operation body is a part of the body such as a hand of the user, the operation body recognition unit 73 recognizes the position, posture, shape, motion, and the like of the part of the body of the user that is the operation body on the basis of the recognition result of the user state recognition unit 72.

For example, in a case where the operation body is a real object other than the body of the user, the operation body recognition unit 73 recognizes the position, posture, shape, motion, and the like of the real object that is the operation body on the basis of the recognition result of the object recognition unit 71.

For example, in a case where the operation body is a virtual object displayed in the field of view of the user, the operation body recognition unit 73 recognizes the position, posture, shape, motion, and the like of the virtual object that is the operation body on the basis of the recognition result of the object recognition unit 71.

For example, in a case where the operation body is the operation device included in the operation unit 15, the operation body recognition unit 73 recognizes the position, posture, shape, motion, and the like of the operation device that is the operation body on the basis of operation data and the like from the operation device.

In step S4, the designated range setting unit 74 selects a target object on the basis of at least one of the state of the user or the state of the operation body.

For example, the designated range setting unit 74 selects a target object from among objects (real objects or virtual objects) in the field of view of the user on the basis of a position to which the user pays attention or a position indicated by the user.

For example, the designated range setting unit 74 selects an object that exists in the vicinity of a position at which the body, face, or line-of-sight of the user is directed as a target object as an object to which the user pays attention the user.

For example, the designated range setting unit 74 sets an object that exists in the vicinity of a position indicated by the operation body as a target object as an object indicated by the user. For example, in a case where the operation body is a hand of the user, an object that exists in a direction in which the hand of the user is directed or an object closest to the hand of the user is selected as a target object.

In step S5, the designated range setting unit 74 sets the designated range on the basis of at least one of the state of the operation body or the state of the target object. Details of a method of setting the designated range will be described below.

In step S6, the output unit 16 displays the designated range under the control of the output control unit 75. Details of a method of displaying the designated range will be described below.

Thereafter, the processing returns to step S1, and the processing in step S1 and the subsequent steps is executed.

<Specific Example of Method of Setting Designated Range>

Next, specific examples of a method of setting the designated range will be described with reference to FIGS. 5 to 21.

<Method Using Distance Between Operation Body and Target Object>

For example, the designated range setting unit 74 calculates a distance between an operation body and a target object on the basis of the position of the operation body recognized by the operation body recognition unit 73 and the position of the target object recognized by the object recognition unit 71.

Note that, in a case where both the operation body and the target object are real objects, a distance in the real space is calculated.

In a case where both the operation body and the target object are virtual objects, a distance in the virtual space is calculated.

In a case where one of the operation body and the target object is a real object and the other is a virtual object, for example, a distance between the position of the real object in the real world and the position of the real world corresponding to the position at which the virtual object is superimposed in the field of view of the user is calculated. The position in the real world corresponding to the position at which the virtual object is superimposed is, for example, a position at which the virtual object is superimposed in the real world in the field of view of the user.

Then, the designated range setting unit 74 sets a designated range on the basis of the distance between the operation body and the target object.

Figure 5:
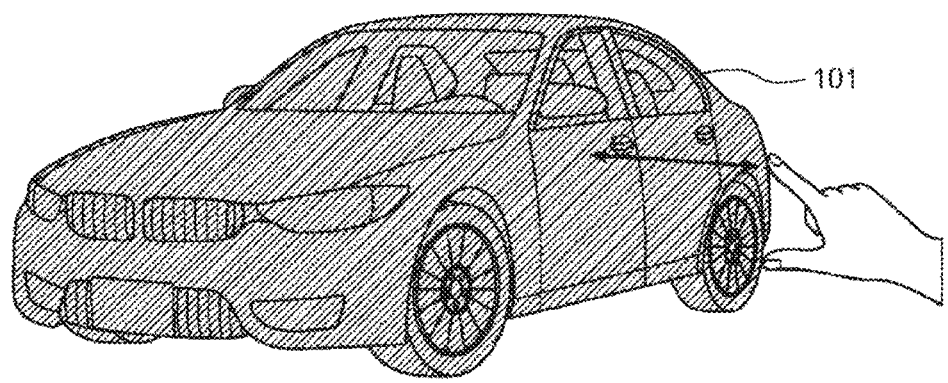
FIG. 5 is a diagram for describing a method of setting a designated range on the basis of a distance between an operation body and a target object.
Figure 5:
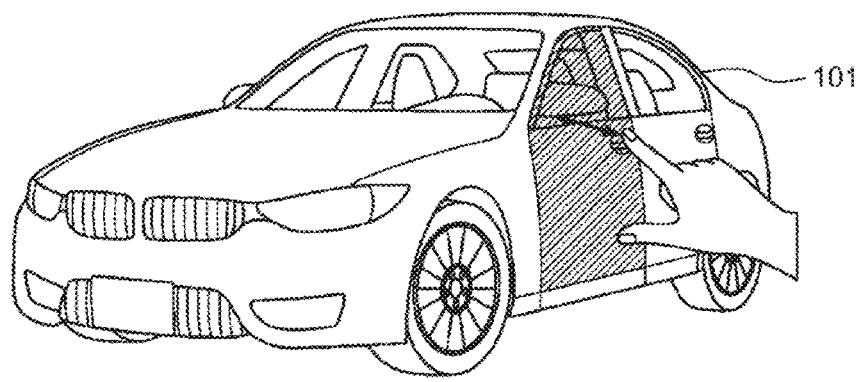
Figure 5:
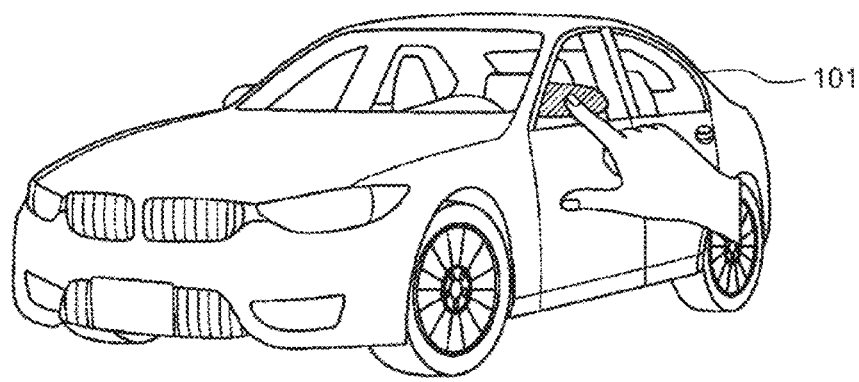

FIG. 5 illustrates an example of a method of setting the designated range on the basis of a distance between an operation body and a target object. Specifically, FIG. 5 illustrates an example of a method of setting the designated range on the basis of a distance da between a hand of the user as the operation body and a vehicle 101 as the target object.

For example, the longer the distance da, the larger the designated range, and the shorter the distance da, the smaller the designated range. For example, in a case where the distance da>a threshold Da1 is satisfied, the entire vehicle 101 is set as the designated range as indicated by the hatched portion in A of FIG. 5. For example, in a case where a threshold Da2≤the distance da≤the threshold Da1 is satisfied, the left front door of the vehicle 101 is set as the designated range as indicated by the hatched portion in B of FIG. 5. For example, in a case where the distance da<the threshold Da2 is satisfied, the door mirror on the left front side of the vehicle 101 is set as the designated range as indicated by the hatched portion in C of FIG. 5.

Note that the designated range setting unit 74 sets a range in which the designated range is reduced on the basis of, for example, at least one of the state of the user or the state of the operation body. For example, the designated range setting unit 74 sets a range in which the designated range is reduced on the basis of a position to which the user pays attention or a position indicated by the user.

Specifically, for example, the designated range setting unit 74 sets a range in which the designated range is reduced in the vicinity of the position of the target object to which the body, face, or line-of-sight of the user is directed. For example, the designated range setting unit 74 sets a range in which the designated range is reduced in the vicinity of the position of the target object indicated by the operation body.

Figure 6:
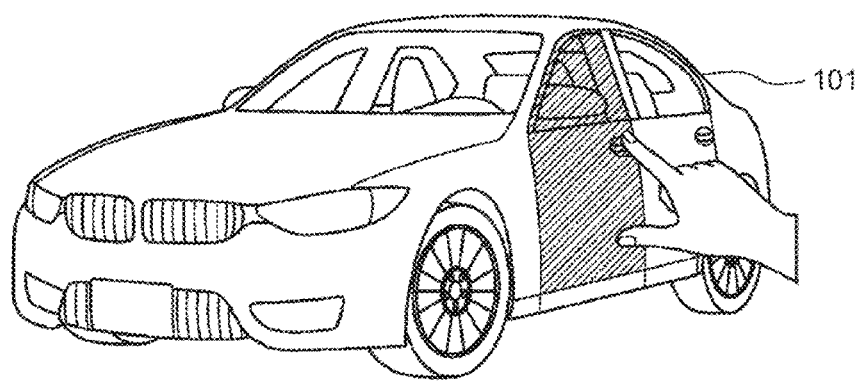
FIG. 6 is a diagram for describing a method of setting the designated range on the basis of a distance between the operation body and the target object.
Figure 6:
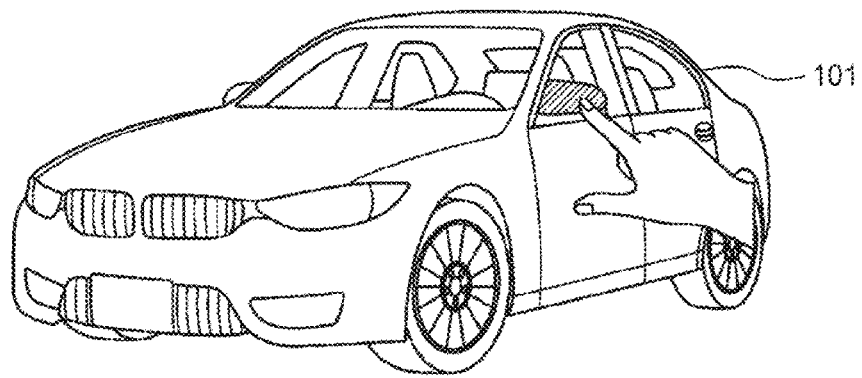

For example, as illustrated in A and B of FIG. 6, in a case where the index finger of the user is directed in a direction of the door mirror on the left front side of the vehicle 101, if the hand of the user is brought close to the vehicle 101, the designated range changes from the door on the left front side of the vehicle 101 to the door mirror on the left front side.

Figure 7:
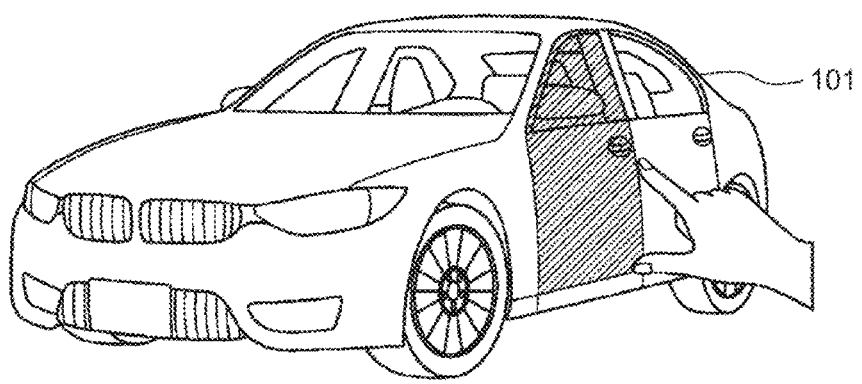
FIG. 7 is a diagram for describing a method of setting the designated range on the basis of a distance between the operation body and the target object.
Figure 7:
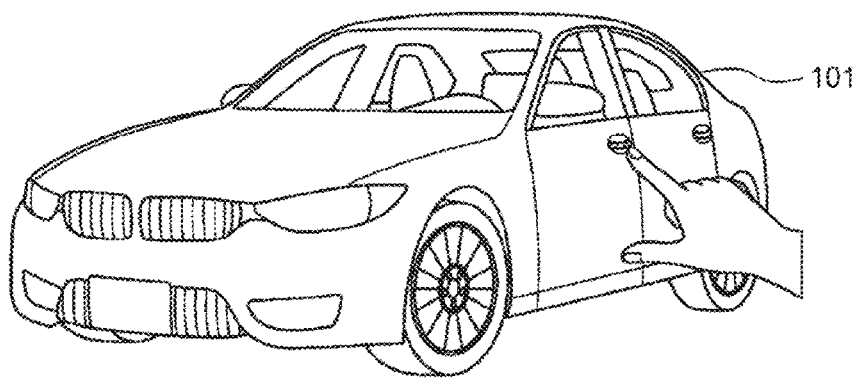

For example, as illustrated in A and B of FIG. 7, in a case where the index finger of the user is directed in a direction of the door handle on the left front side of the vehicle 101, if the hand of the user is brought close to the vehicle 101, the designated range changes from the door on the left front side of the vehicle 101 to the door handle on the left front side.

Furthermore, for example, the user may set a range in which the designated range is reduced in advance. In this case, for example, the range in which the designated range is reduced is fixed regardless of a position to which the user pays attention or a position indicated by the user.

Note that, in other methods for setting the designated range to be described below, a range in which the designated range is reduced is set by a similar method.

Furthermore, for example, the threshold Da1 and the threshold Da2 may be changed on the basis of the attribute of the target object, the size of the body of the user (for example, height), the eyesight of the user, the angle of view of the display device, and the like.

Moreover, for example, in a case where the target object is a virtual object, the output control unit 75 may stop the target object while the designated range is being set so that the designated range can be easily set.

Then, the output unit 16 displays the set designated range under the control of the output control unit 75. For example, the designated range is set in a display mode different from the surroundings so that the user can easily recognize the designated range.

For example, in a case where the target object is a real object, a display effect is superimposed on the designated range of the real object in the field of view of the user. For example, in the field of view of the user, video of a predetermined color or pattern is superimposed on the designated range, or a frame surrounding the periphery of the designated range is superimposed.

For example, in a case where the target object is a real object, video of a predetermined color or pattern is projected onto the designated range of the real object by projection mapping or the like.

For example, in a case where the target object is a virtual object, a display effect is applied to the designated range of the virtual object. For example, the color, brightness, pattern, and the like of the designated range change, or a frame indicating the designated range is displayed.

Furthermore, for example, during the setting of the designated range, a designated range larger by one than the current designated range and a designated range smaller by one may be indicated.

Figure 8:
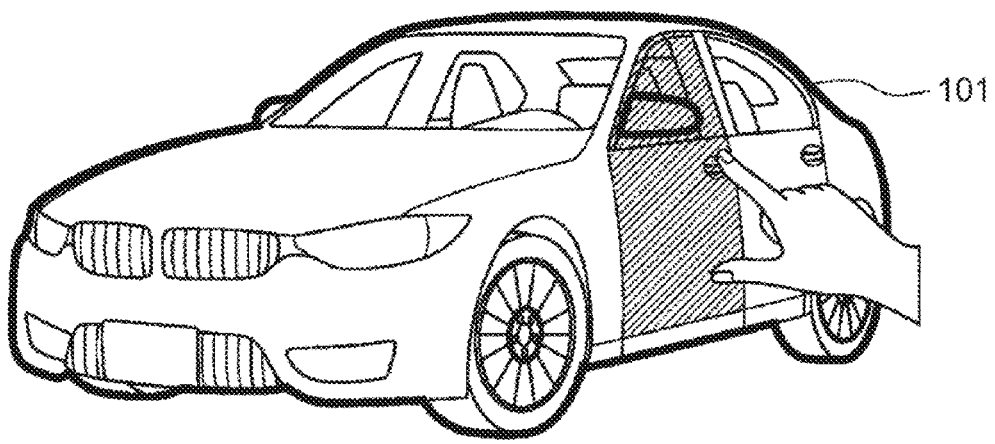
FIG. 8 is a diagram illustrating an example of a method of displaying the designated range.

Specifically, in the example of FIG. 8, the entire door on the left front side of the vehicle 101 is set as the designated range. Then, the periphery of the entire vehicle 101 that is a designated range larger by one than the door on the left front side is surrounded by a frame line. Furthermore, the periphery of the door mirror on the left front side that is a designated range smaller by one than the door on the left front side is surrounded by a frame line.

In this way, the user can easily and reliably designate a desired range of the target object only by moving the operation body close to or away from the target object. As a result, the user can quickly perform an operation for a desired range of the target object and reduce an operation error for a desired range of the target object.

Note that, for example, a range in which the designated range can be set may be changed on the basis of the position of the user with respect to the target object.

Figure 9:
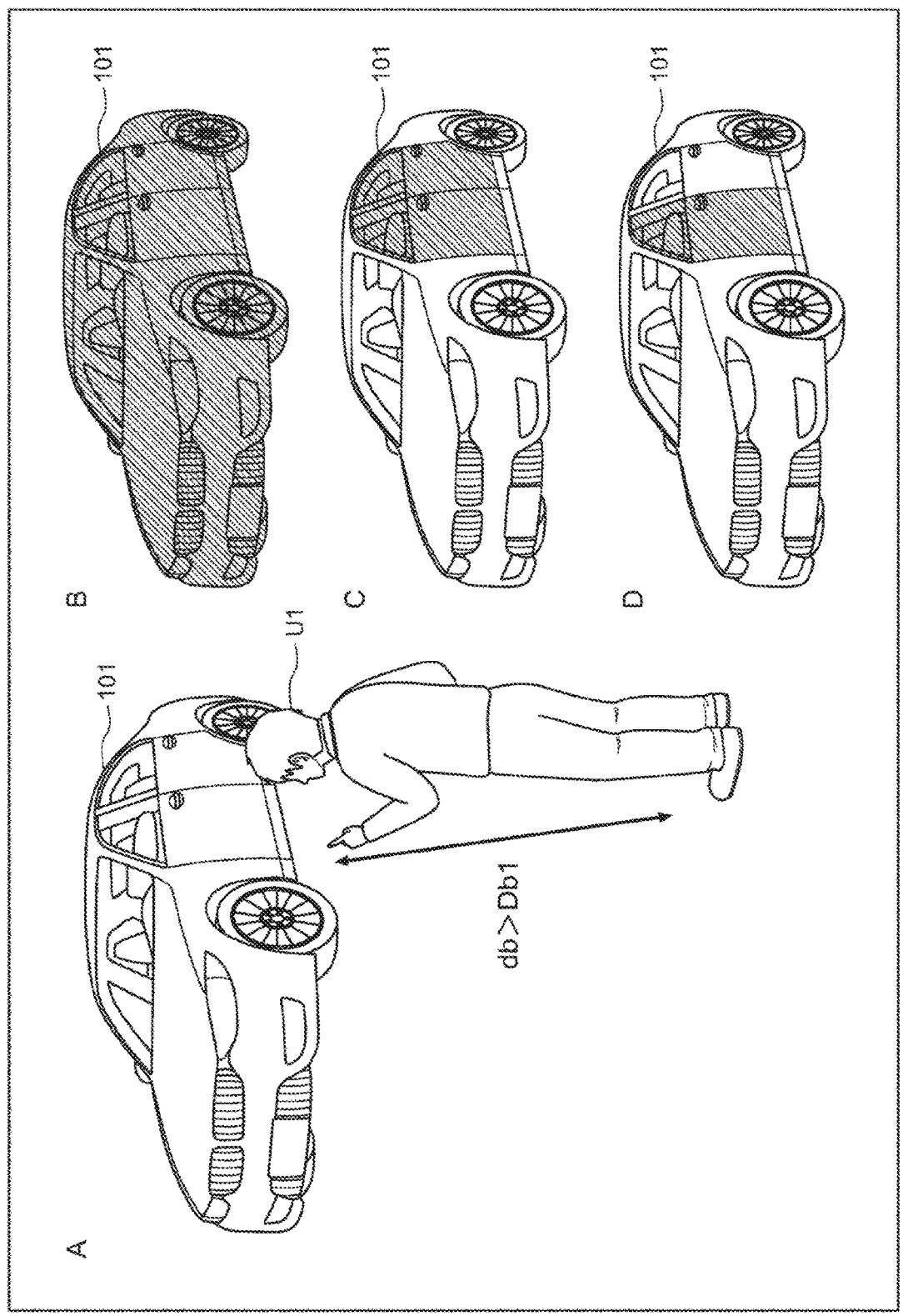
FIG. 9 is a diagram for describing a method of setting the designated range on the basis of a distance between the user and the target object.

Specifically, FIG. 9 illustrates an example of a case where a distance db between a user U1 and the vehicle 101 as the target object is larger than a threshold Db1. In this case, as illustrated in B to D of FIG. 9, any one of the entire vehicle 101, the doors on the left front side and the left rear side of the vehicle 101, and the door on the left front side of the vehicle 101 is set as the designated range according to a distance between a hand of the user U1 and the vehicle 101.

Figure 10:
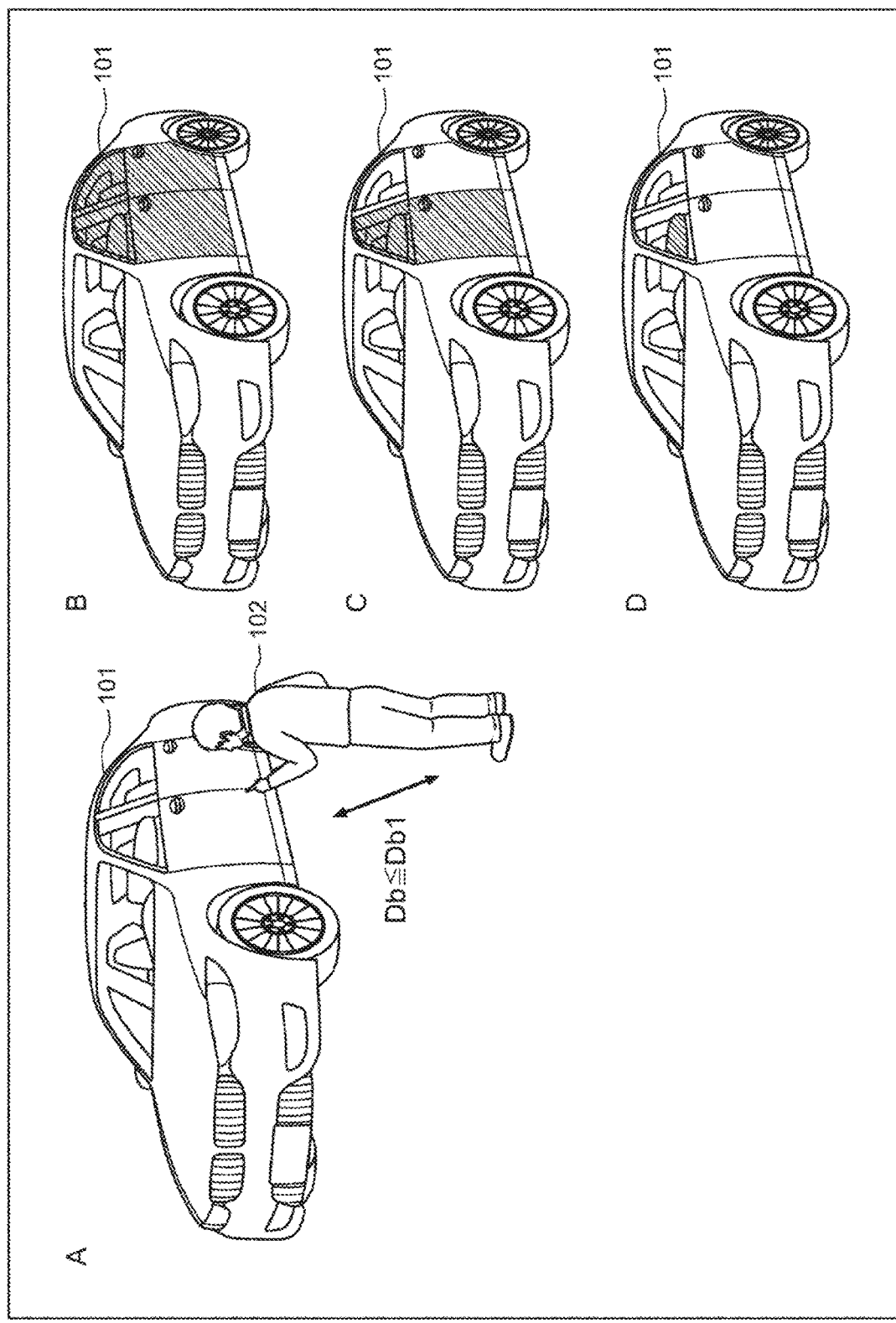
FIG. 10 is a diagram for describing a method of setting the designated range on the basis of a distance between the user and the target object.

FIG. 10 illustrates an example of a case where the distance db between the user U1 and the vehicle 101 is equal to or less than the threshold Db1. In this case, as illustrated in B to D of FIG. 10, any one of the doors on the left front side and the left rear side of the vehicle 101, the door on the left front side of the vehicle 101, and the door mirror on the left front side of the vehicle 101 is set as the designated range according to a distance between a hand of the user U1 and the vehicle 101.

As described above, the more the user moves away from the target object, the larger the range in which the designated range can be set, and the closer the user moves to the target object, the smaller the range in which the designated range can be set. This is because in a case where the user is away from the target object, the user is more likely to see the entire target object, and in a case where the user is close to the target object, the user is more likely to see details of the target object.

Note that, for example, the designated range setting unit 74 may change settable levels of the designated range on the basis of the attribute of the user. For example, levels at which the designated range can be set are set to 10 levels for a user who is accustomed to operating the information processing device 1, and the levels at which the designated range can be set are set to three levels for a user who is not accustomed to operating the information processing device 1.

<Method Using Shape of Operation Body>

For example, in a case where the shape of the operation body is changeable, the designated range setting unit 74 can set the designated range on the basis of the shape of the operation body.

Figure 11:
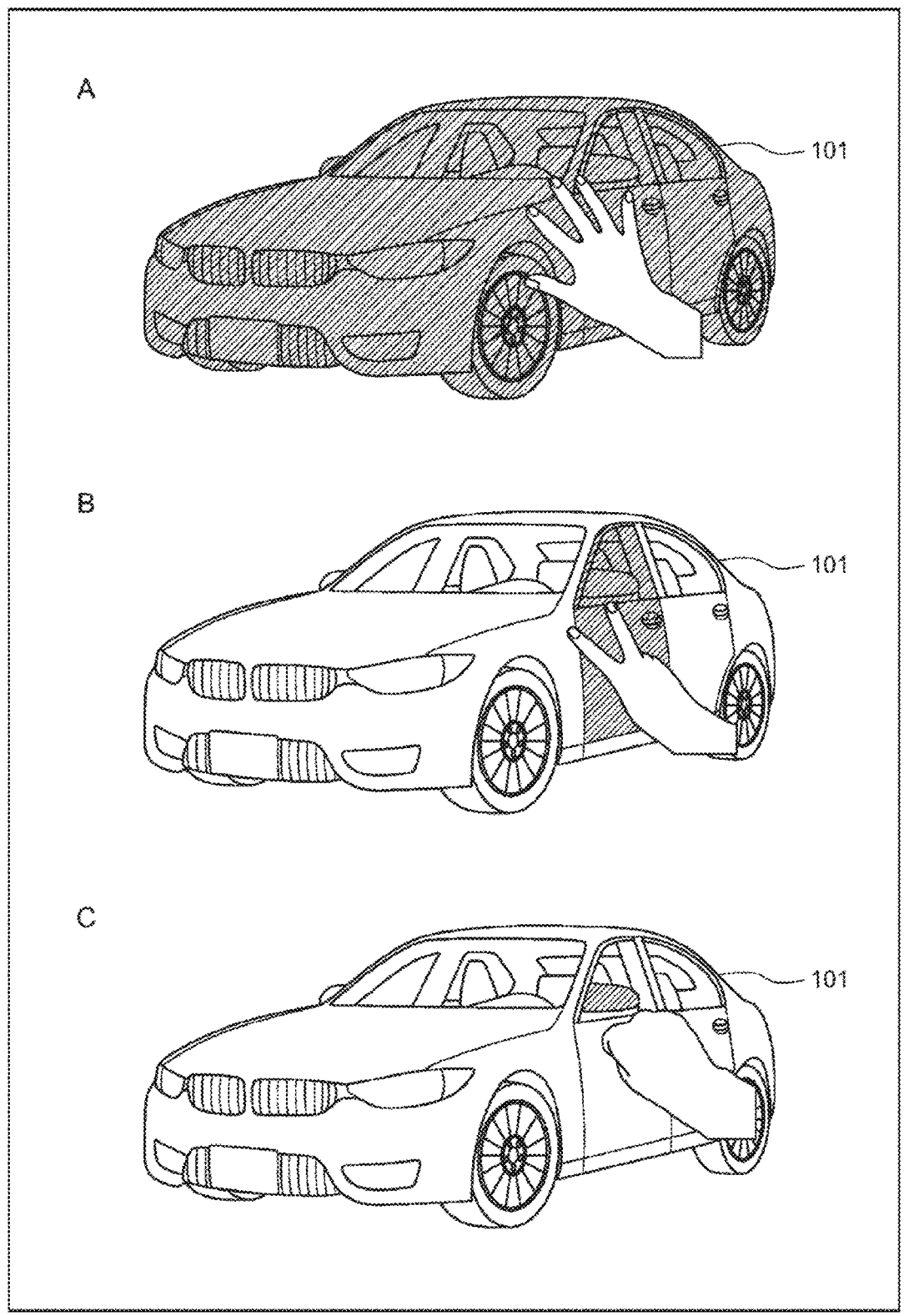
FIG. 11 is a diagram for describing a method of setting the designated range on the basis of the shape of the operation body.

FIG. 11 illustrates an example in which the designated range is set on the basis of the shape of the operation body. Specifically, FIG. 11 illustrates an example in which the designated range is set on the basis of the degree of opening of a hand of the user as the operation body.

For example, the larger the degree of opening of a hand of the user, the larger the designated range, and the smaller the degree of opening of the hand of the user hand, the smaller the designated range. For example, as illustrated in A of FIG. 11, in a case where the hand of the user is in a paper-like shape, the entire vehicle 101 is set as the designated range. For example, as illustrated in B of FIG. 11, in a case where the hand of the user is in a scissor-like shape, the door on the left front side of the vehicle 101 is set as the designated range. For example, as illustrated in C of FIG. 11, in a case where the hand of the user is in a rock-like shape, the door mirror on the left front side of the vehicle 101 is set as the designated range.

Figure 12:
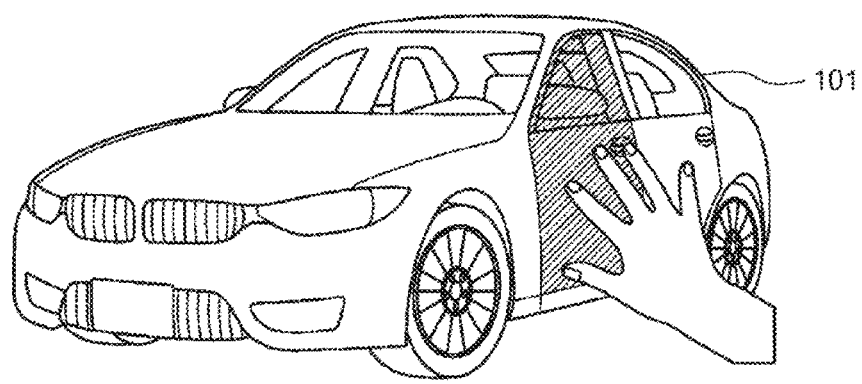
FIG. 12 is a diagram for describing a method of setting the designated range on the basis of the shape of the operation body.
Figure 12:
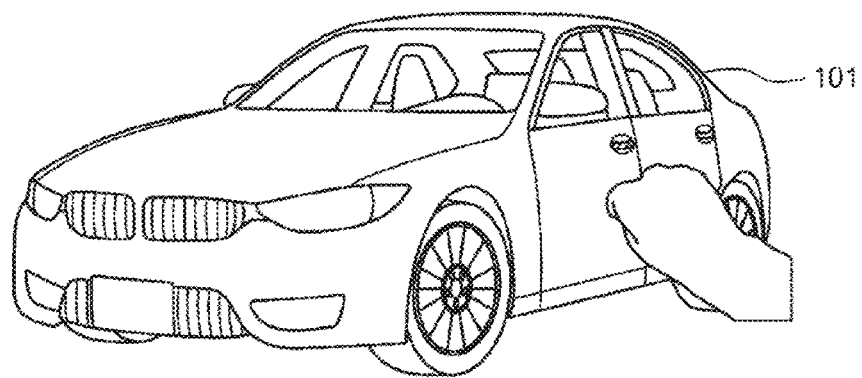

FIG. 12 illustrates an example in which the designated range is set on the basis of the degree of relevance between the shape of the operation body and the target object. Specifically, FIG. 12 illustrates an example in which the designated range is set on the basis of the degree of relevance between the shape of a hand of the user as the operation body and the vehicle 101 as the target object.

For example, as illustrated in A of FIG. 12, in a case where the hand of the user is open so as to be substantially parallel to the door on the left front side of the vehicle 101, the entire door on the left front side of the vehicle 101 is set as the designated range. For example, as illustrated in B of FIG. 12, in a case where the shape of the hand of the user is for gripping a door handle, the door handle on the left front side of the vehicle 101 is set as the designated range.

Figure 13:
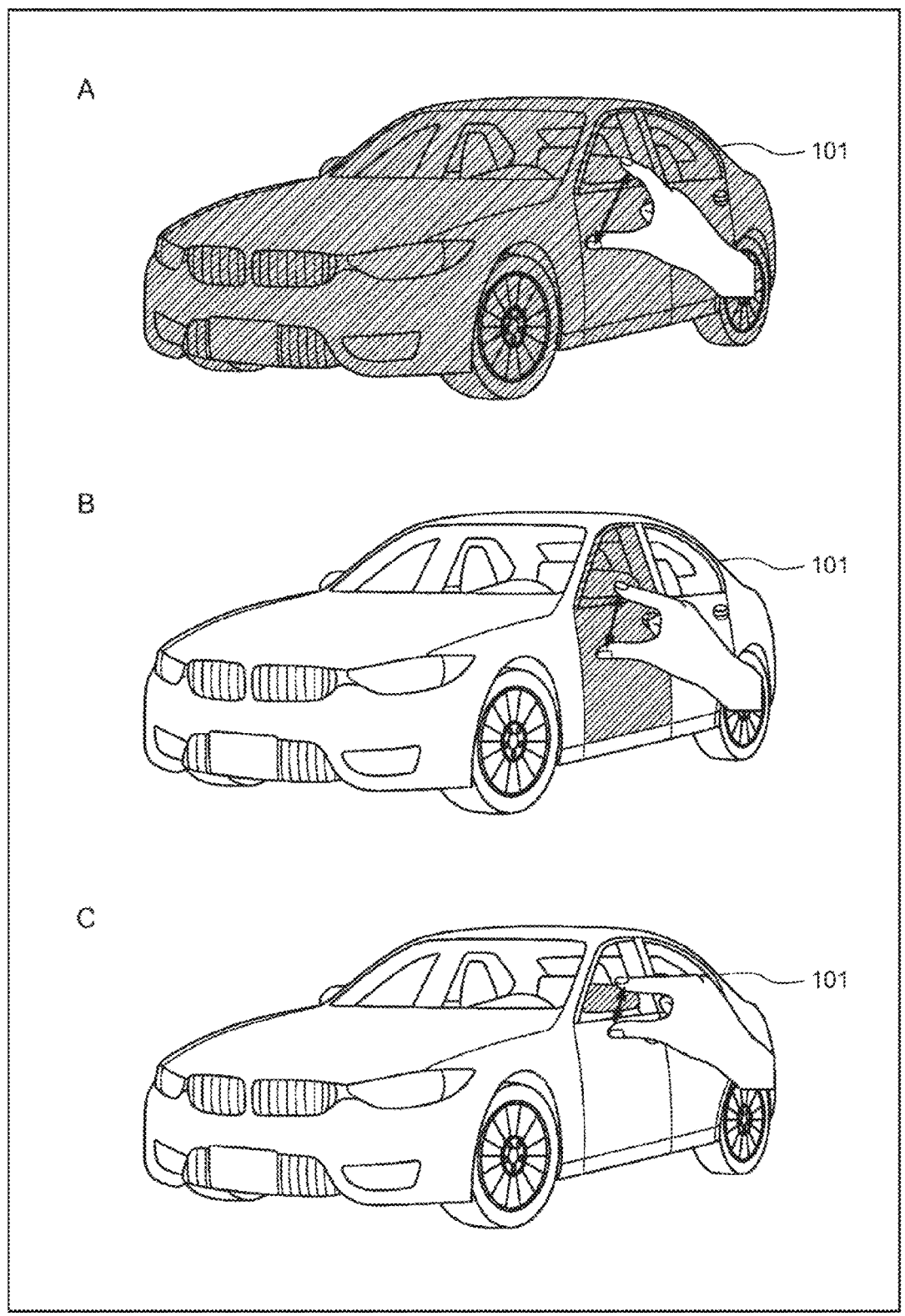
FIG. 13 is a diagram for describing a method of setting the designated range on the basis of a distance between a thumb and an index finger.

FIG. 13 illustrates an example in which the designated range is set on the basis of a distance between at least two points of the operation body. Specifically, FIG. 13 illustrates an example in which the designated range is set on the basis of a distance (interval) dc between the thumb and the index finger of a hand of the user as the operation body.

For example, the longer the distance dc, the larger the designated range, and the shorter the distance dc, the smaller the designated range. For example, in a case where the distance dc>a threshold D1c is satisfied, the entire vehicle 101 is set as the designated range as indicated by A of FIG. 13. For example, in a case where a threshold D2c≤the distance dc≤the threshold D1c is satisfied, the door on the left front side of the vehicle 101 is set as the designated range as indicated by B of FIG. 13. For example, in a case where the distance dc<the threshold D2c is satisfied, the door mirror on the left front side of the vehicle 101 is set as the designated range as indicated by C of FIG. 13.

Figure 14:
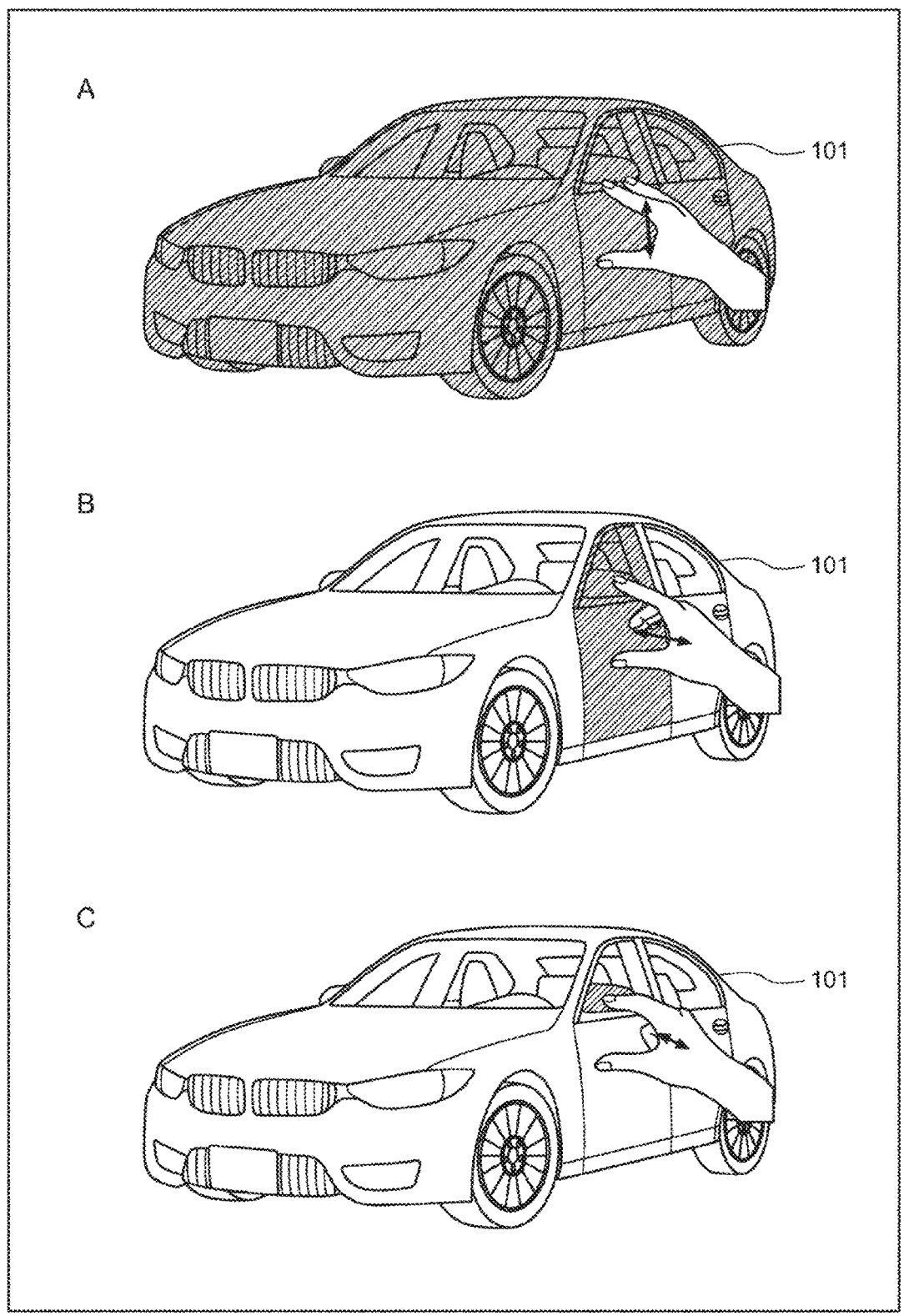
FIG. 14 is a diagram for describing a method of setting the designated range on the basis of a distance between a middle finger, a ring finger, and a little finger and a palm.

FIG. 14 illustrates another example in which the designated range is set on the basis of a distance between at least two points of the operation body. Specifically, FIG. 14 illustrates an example in which the designated range is set on the basis of a distance (interval) dd between the middle finger, the ring finger, and the little finger and the palm of a hand of the user as the operation body.

For example, the longer the distance dd, the larger the designated range, and the shorter the distance dd, the smaller the designated range. For example, in a case where the distance dd>a threshold D1d is satisfied, the entire vehicle 101 is set as the designated range as indicated by A of FIG. 14. For example, in a case where a threshold D2d≤the distance dd≤the threshold D1d is satisfied, the door on the left front side of the vehicle 101 is set as the designated range as indicated by B of FIG. 14. For example, in a case where the distance dd<the threshold D2d is satisfied, the door mirror on the left front side of the vehicle 101 is set as the designated range as indicated by C of FIG. 14.

As described above, the user can easily and reliably designate a desired range of the target object only by changing the shape of the operation body.

<Method Using Posture of Operation Body>

For example, the designated range setting unit 74 can set the designated range on the basis of the posture of the operation body.

Figure 15:
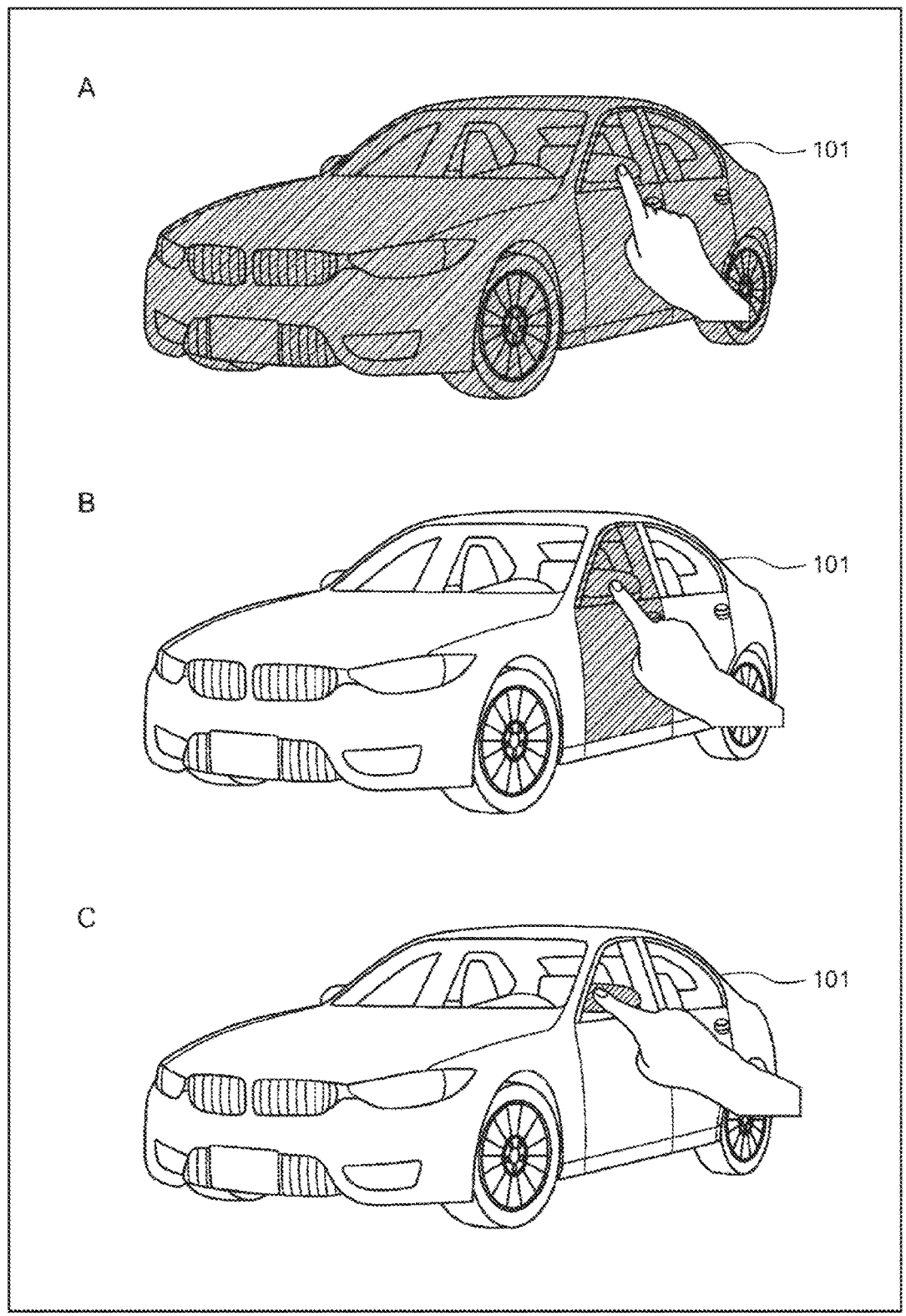
FIG. 15 is a diagram for describing a method of setting the designated range on the basis of an angle of a hand of the user in a vertical direction.

FIG. 15 illustrates an example in which the designated range is set on the basis of the inclination in the vertical direction of the operation body. Specifically, FIG. 15 illustrates an example in which the designated range is set on the basis of an angle θa in the vertical direction of the index finger of a hand of the user in a case where the horizontal direction is set as a reference (in a case where the horizontal direction is set to 0°).

For example, the larger the angle θa (as the index finger is directed upward), the larger the designated range, and the smaller the angle θa (as the index finger is directed downward), the smaller the designated range. For example, in a case where the angle θa>a threshold TH1a is satisfied, the entire vehicle 101 is set as the designated range as indicated by A of FIG. 15. For example, in a case where a threshold TH2a≤the angle θa≤the threshold TH1a is satisfied, the door on the left front side of the vehicle 101 is set as the designated range as indicated by B of FIG. 15. For example, in a case where the angle θa<the threshold TH2a is satisfied, the door mirror on the left front side of the vehicle 101 is set as the designated range as indicated by C of FIG. 15.

Figure 16:
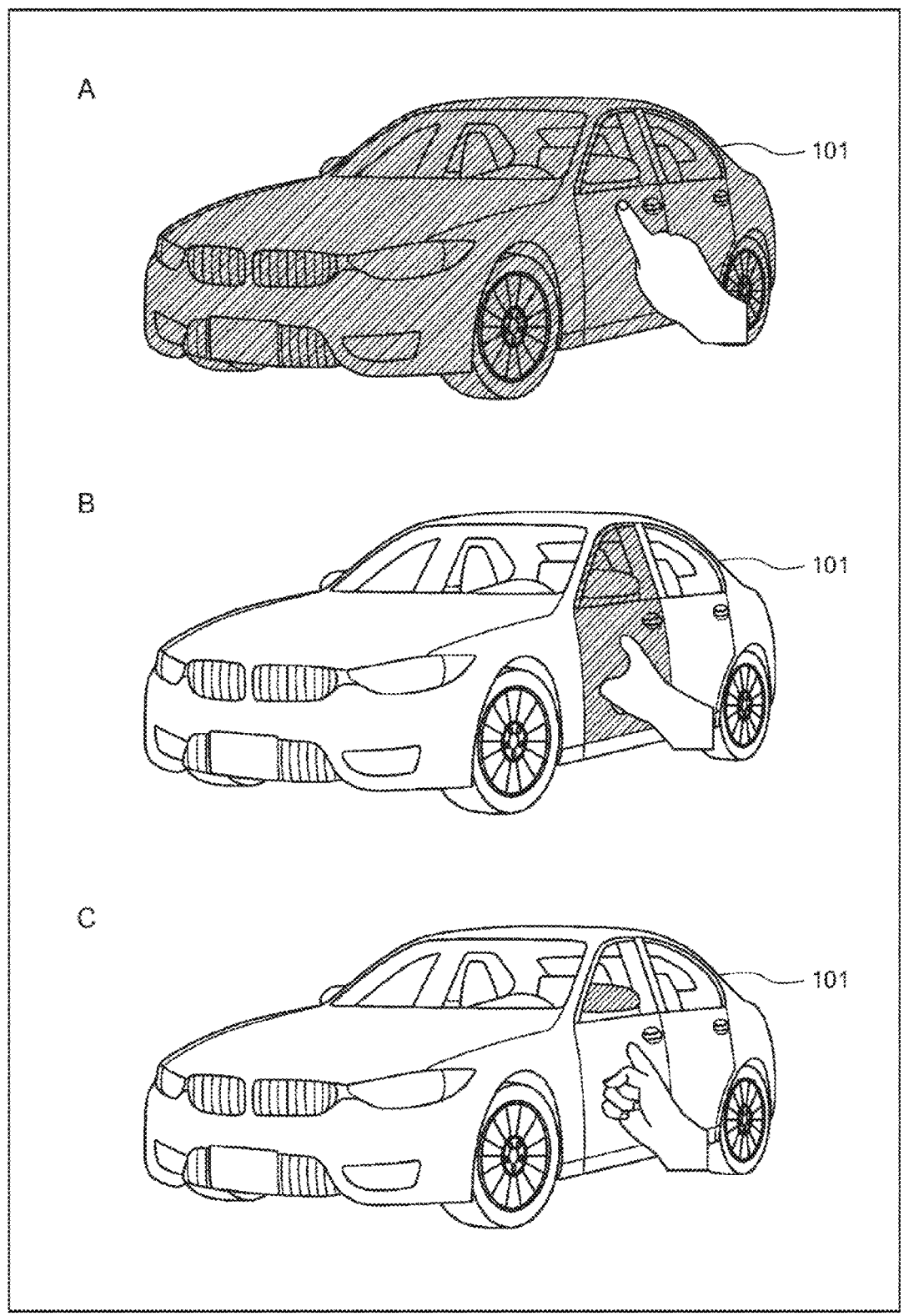
FIG. 16 is a diagram for describing a method of setting the designated range on the basis of an angle of a hand of the user in a rotation direction.

FIG. 16 illustrates an example in which the designated range is set on the basis of an angle in the rotation direction of the operation body. Specifically, FIG. 16 illustrates an example in which the designated range is set on the basis of an angle θb in the rotation direction of a hand of the user with a direction in which the index finger is unbent in a state where the index finger is unbent as an axis. The angle θb is based on a state in which the index finger is unbent without twisting the wrist (angle θb=) 0°, and is positive in a clockwise direction and negative in a counterclockwise direction.

For example, the smaller the angle θb, the larger the designated range, and the larger the angle θb, the smaller the designated range. For example, in a case where the angle θb<a threshold TH1b is satisfied, the entire vehicle 101 is set as the designated range as indicated by A of FIG. 16. For example, in a case where the threshold TH1b≤the angle θb≤a threshold TH2b is satisfied, the door on the left front side of the vehicle 101 is set as the designated range as indicated by B of FIG. 16. For example, in a case where the angle θb>the threshold TH2b is satisfied, the door mirror on the left front side of the vehicle 101 is set as the designated range.

As described above, the user can easily and reliably designate a desired range of the target object only by changing the posture of the operation body.

<Method Using Distance Between Operation Bodies>

For example, in a case where there is a plurality of operation bodies, the designated range setting unit 74 can set the designated range on the basis of a distance between the operation bodies.

Figure 17:
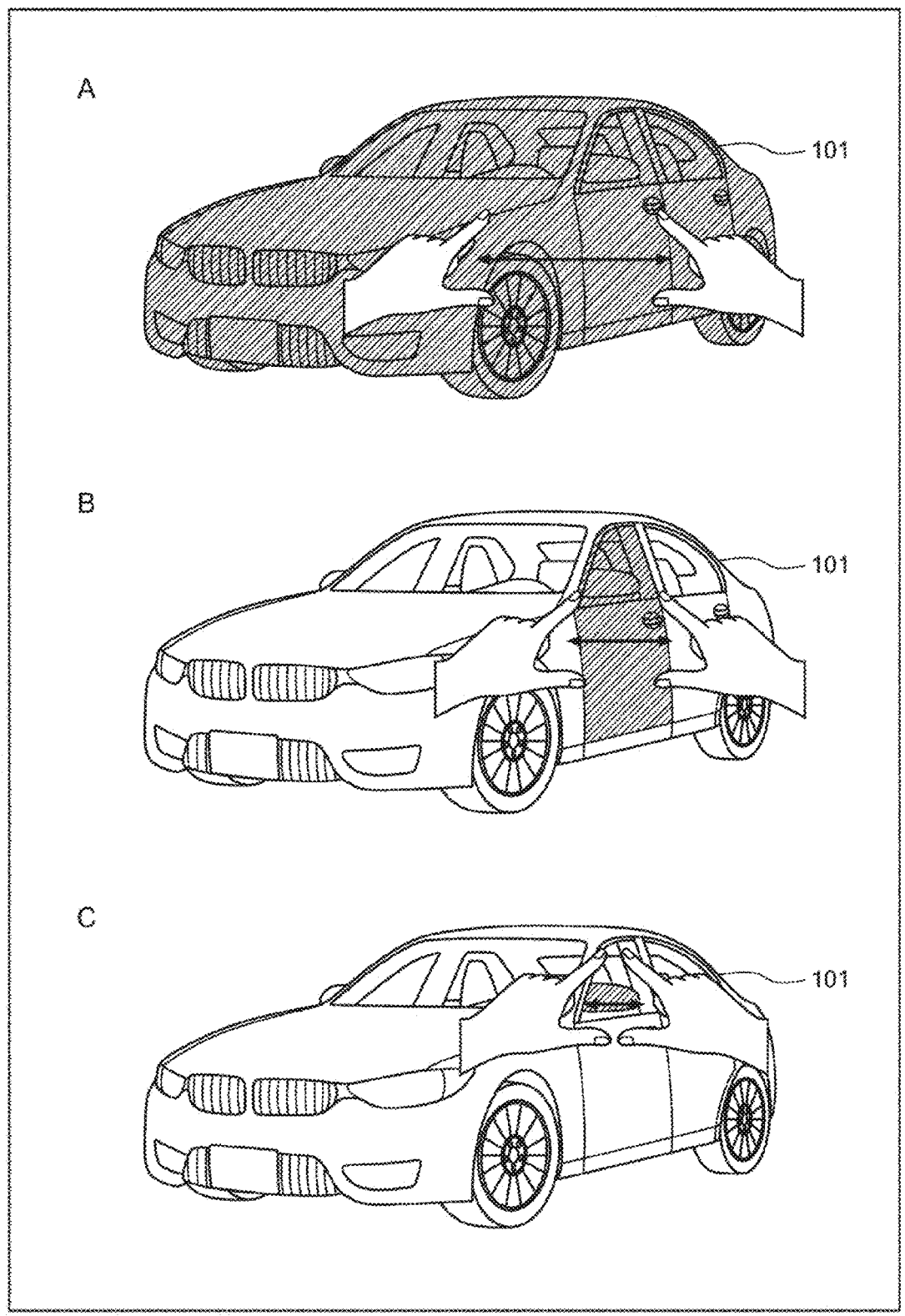
FIG. 17 is a diagram for describing a method of setting the designated range on the basis of a distance between both hands of the user.

FIG. 17 illustrates an example in which the designated range is set on the basis of a distance between the operation bodies. Specifically, FIG. 17 illustrates an example in which the designated range is set on the basis of a distance (interval) de between the left hand and the right hand of the user as the operation bodies.

For example, the longer the distance de, the larger the designated range, and the shorter the distance de, the smaller the designated range. For example, in a case where the distance de>a threshold D1e is satisfied, the entire vehicle 101 is set as the designated range as indicated by A of FIG. 17. For example, in a case where a threshold D2e≤the distance de≤the threshold D1e is satisfied, the door on the left front side of the vehicle 101 is set as the designated range as indicated by B of FIG. 17. For example, in a case where the distance de<the threshold D2e is satisfied, the door mirror on the left front side of the vehicle 101 is set as the designated range as indicated by C of FIG. 17.

As described above, the user can easily and reliably designate a desired range of the target object only by changing the distance between the operation bodies.

<Method Using Stationary Time of Operation Body>

For example, the designated range setting unit 74 can set the designated range on the basis of a stationary time of the operation body.

Figure 18:
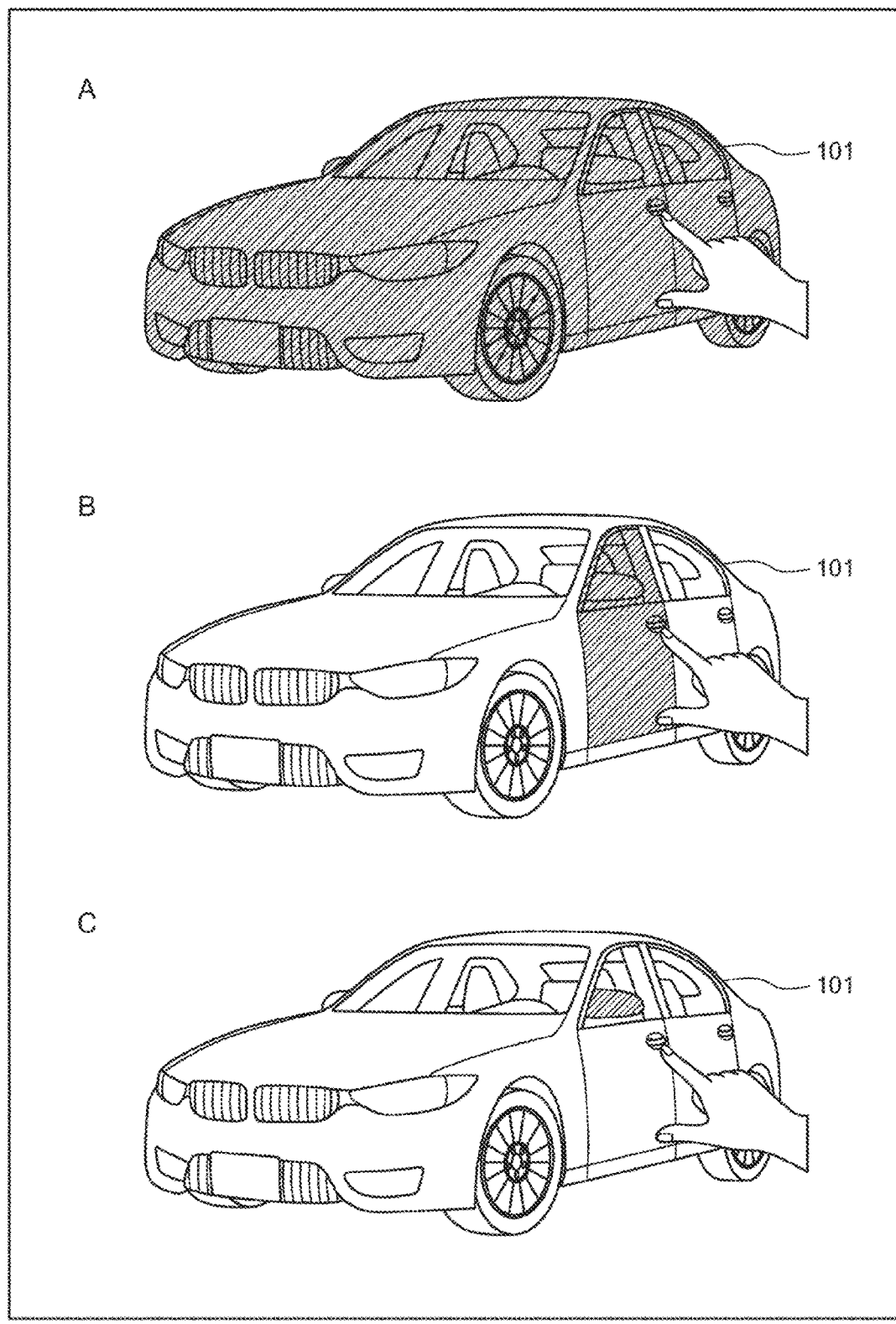
FIG. 18 is a diagram for describing a method of setting the designated range on the basis of a stationary time of the operation body.

FIG. 18 illustrates an example in which the designated range is set on the basis of a stationary time of the operation body. Specifically, FIG. 18 illustrates an example in which the designated range is set on the basis of a time t during which a hand of the user as the operation body is stationary while pointing at the vehicle 101 as the target object.

Here, a state in which the hand of the user is stationary refers to, for example, a state in which the movement amount of the hand is in a predetermined range.

For example, the longer the stationary time t, the smaller the designated range. For example, in a case where the stationary time t<a threshold T1 is satisfied, the entire vehicle 101 is set as the designated range as indicated by A of FIG. 18. For example, in a case where the threshold T1≤the stationary time t≤a threshold T2 is satisfied, the door on the left front side of the vehicle 101 is set as the designated range as indicated by B of FIG. 18. For example, in a case where the stationary time t>the threshold T2 is satisfied, the door mirror on the left front side of the vehicle 101 is set as the designated range as indicated by C of FIG. 18.

As described above, the user can easily and reliably designate a desired range of the target object only by continuously making the operation body stationary.

<Method Using Setting of Designated Range of Another User>

For example, it is assumed that a plurality of users sets a designated range for the same object in the virtual world. In this case, for example, the designated range setting unit 74 can set the designated range set by the previous user as a designated range of default regardless of the method of setting the designated range.

Figure 19:
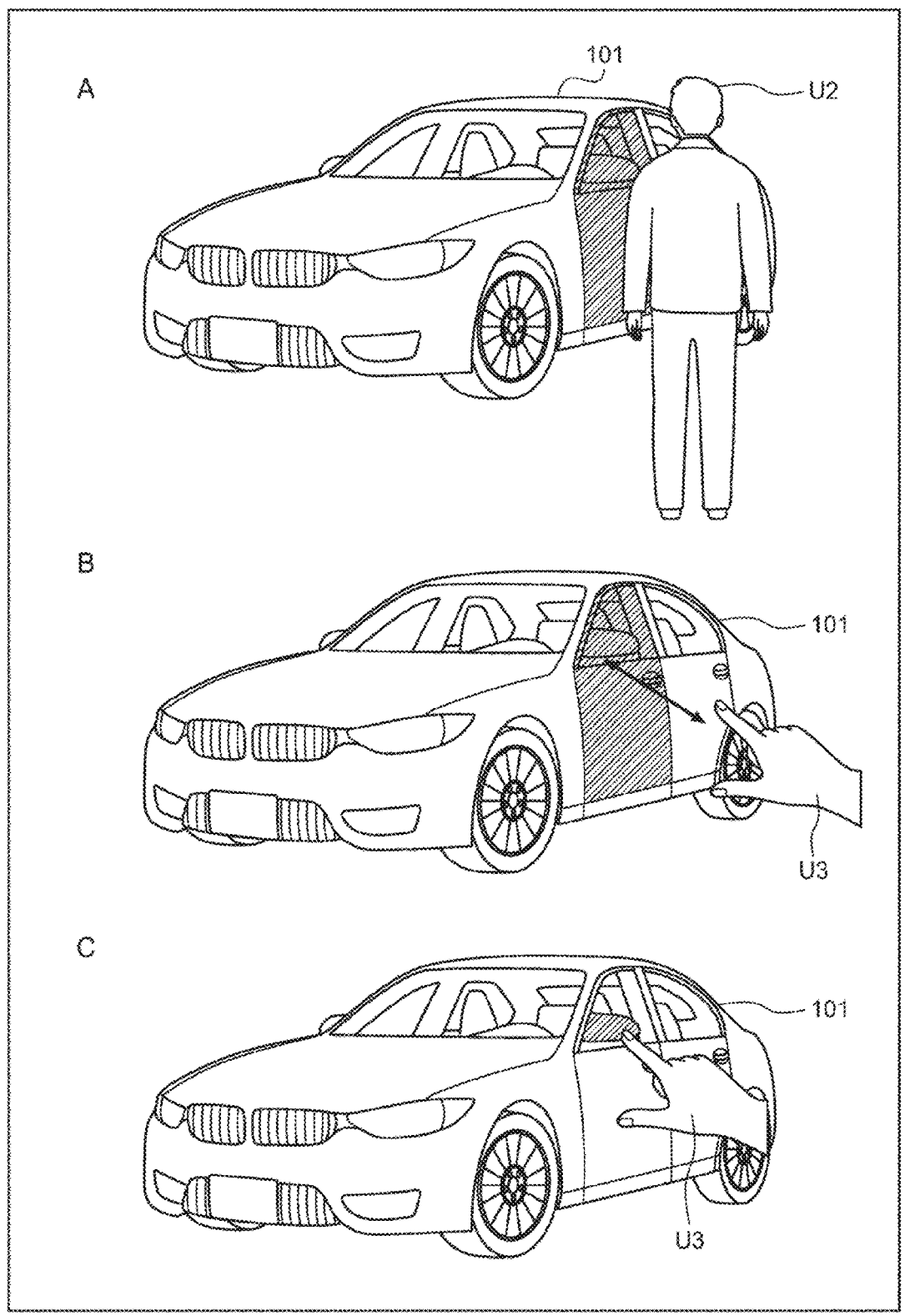
FIG. 19 is a diagram for describing a method of setting a designated range of default on the basis of a designated range set by another user.
Figure 20:
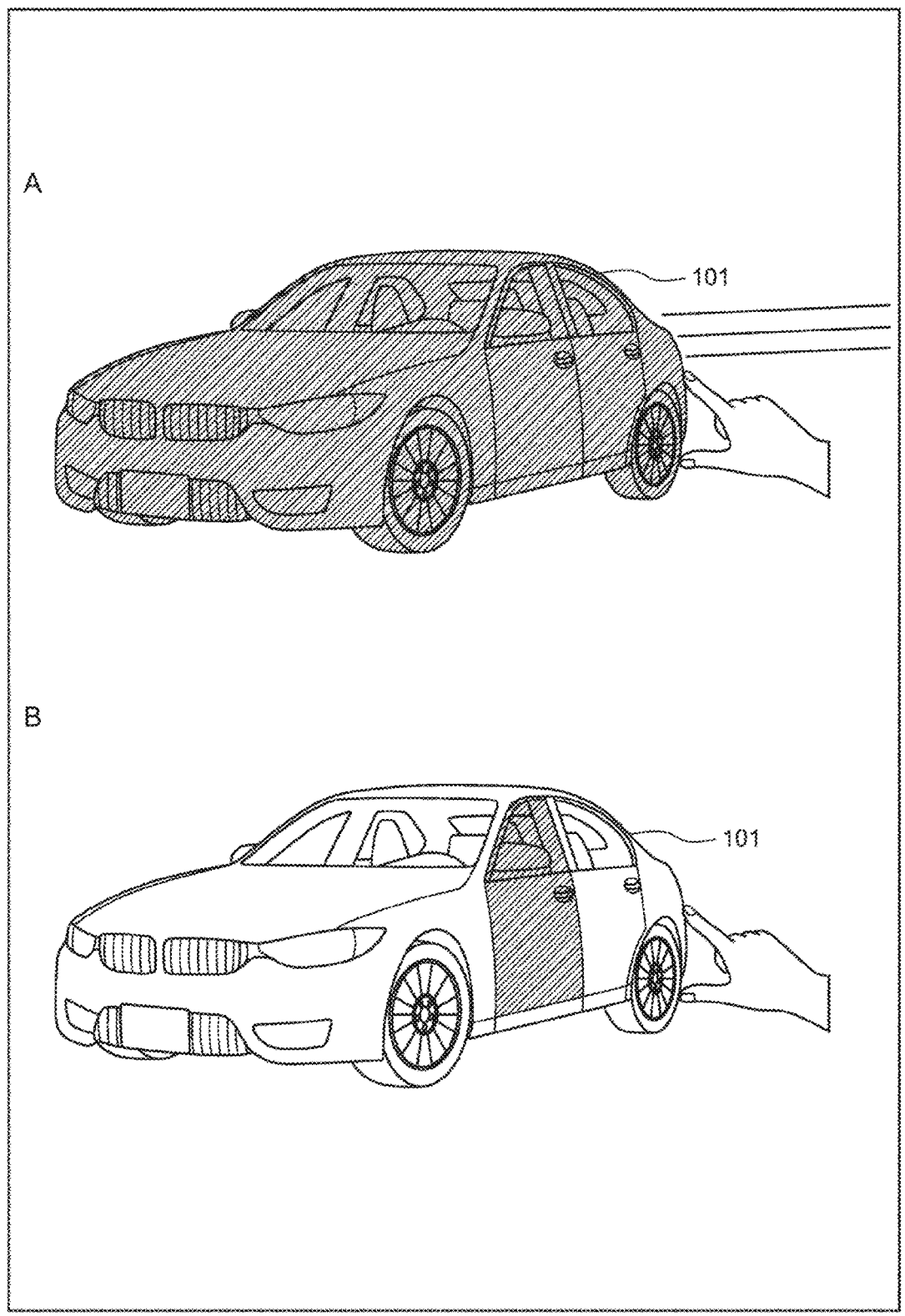
FIG. 20 is a diagram for describing a method of setting the designated range on the basis of the moving speed of the target object.

For example, as illustrated in A of FIG. 19, it is assumed that a previous user U2 has set the door on the left front side of the vehicle 101 as the designated range.

Next, in a case where a user U3 points at the vehicle 101 so as to set the designated range, for example, as illustrated in B of FIG. 19, firstly, the door on the left front side of the vehicle 101 is set as the designated range by default regardless of the distance between a hand of the user U3 and the vehicle 101.

Then, for example, the designated range is set with reference to an initial value of the distance (hereinafter, referred to as reference distance) between the hand of user U3 and the vehicle 101. For example, in a case where the distance between the hand of user U3 and the vehicle 101 is made shorter such that the vehicle 101 is approached by a predetermined distance or more from the reference distance, the door mirror on the left front side of the vehicle 101 is set as the designated range as illustrated in C of FIG. 19. For example, in a case where the distance between the hand of user U3 and the vehicle 101 is made longer such that the vehicle 101 is distanced by a predetermined distance or more from the reference distance, the entire vehicle 101 is set as the designated range although not illustrated.

As described above, the user can easily designate the range of the target object designated by the previous user.

<Method Using Moving Speed of Target Object>

For example, in a case where the designated range is set by the above-described methods, the designated range setting unit 74 may change the designated range on the basis of the moving speed of the target object.

For example, in a case where the designated range is set on the basis of the distance between a hand of the user and the vehicle 101, the designated range changes depending on the moving speed of the vehicle 101 even if the distance between the hand of the user and the vehicle 101 is the same.

For example, the higher a moving speed s of the vehicle 101, the larger the designated range, and the lower the moving speed of the vehicle 101, the smaller the designated range. For example, in a case where the moving speed s>a threshold S1 is satisfied, the entire vehicle 101 is set as the designated range as indicated by A of FIG. 20. For example, in a case where the moving speed s≤the threshold S1 is satisfied, even if the distance between the hand of the user and the vehicle 101 is the same as that of A of FIG. 20, the door on the left front side of the vehicle 101 is set as the designated range as illustrated in B of FIG. 20.

As described above, in a case where setting the detailed designated range is difficult because the moving speed of the target object is high, the designated range is set to be large. On the other hand, in a case where setting the detailed designated range is easy because the moving speed of the target object is low or the target object is stationary, the designated range is set to be small.

<Method of Setting Designated Range in Depth Direction of Target Object>

For example, the designated range setting unit 74 may move the position of the designated range in the depth direction on the basis of the distance between the operation body and the target object.

Here, the depth direction is, for example, a direction parallel to a direction in which the user views the target object, and is a direction in which the user gets closer to or away from the target object.

Figure 21:
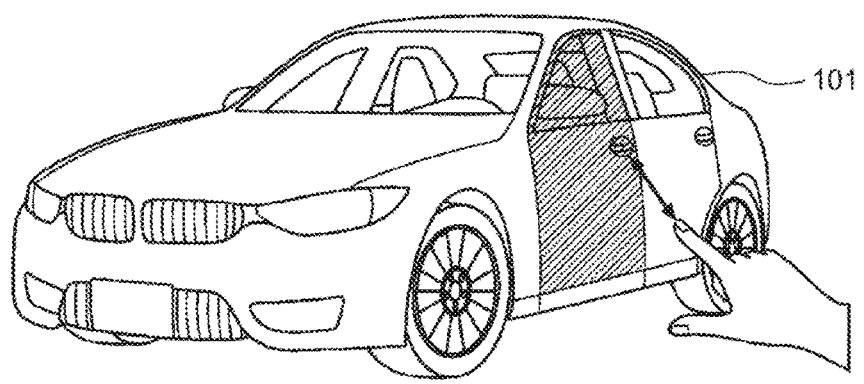
FIG. 21 is a diagram for describing a method of setting the designated range in a depth direction of the target object.
Figure 21:
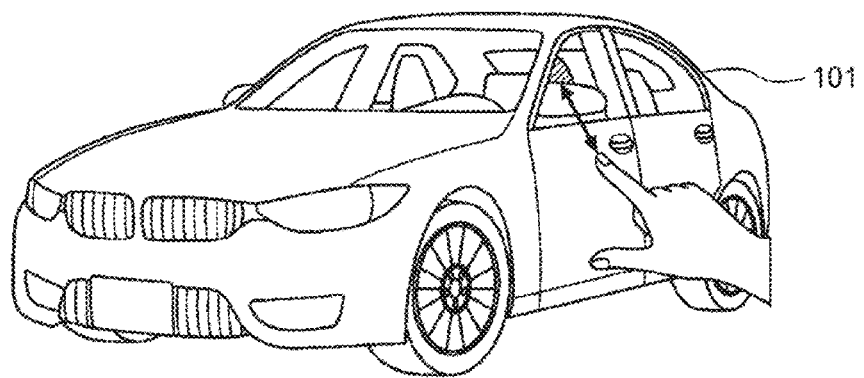

FIG. 21 illustrates an example in which the position of the designated range in the depth direction on the basis of the distance between the operation body and the target object. Specifically, FIG. 21 illustrates an example in which the position of the designated range in the depth direction on the basis of the distance between a hand of the user as the operation body and the vehicle 101 as the target object.

For example, in A of FIG. 21, the door on the left front side of the vehicle 101 is set as the designated range. Then, as illustrated in B of FIG. 21, in a case where the hand of the user approaches the vehicle 101, the designated range moves in the depth direction and is set to the headrest of the left front seat in the interior of the vehicle 101.

Note that, for example, a case of changing the size of the designated range and a case of moving the designated range in the depth direction may be switched on the basis of the distance between the operation body and the target object on the basis of a predetermined operation.

For example, in a case where the user sets the designated range using one of the left and right hands, the size of the designated range may be changed on the basis of the distance between the hand of the user and the target object. On the other hand, in a case where the designated range is set using the other hand, the designated range may move in the depth direction on the basis of the distance between the hand of the user and the target object.

Note that the above-described methods for setting the designated range can be combined within a possible range.

2. Second Embodiment

Next, a second embodiment of the present technology will be described with reference to FIG. 22.

Figure 22:
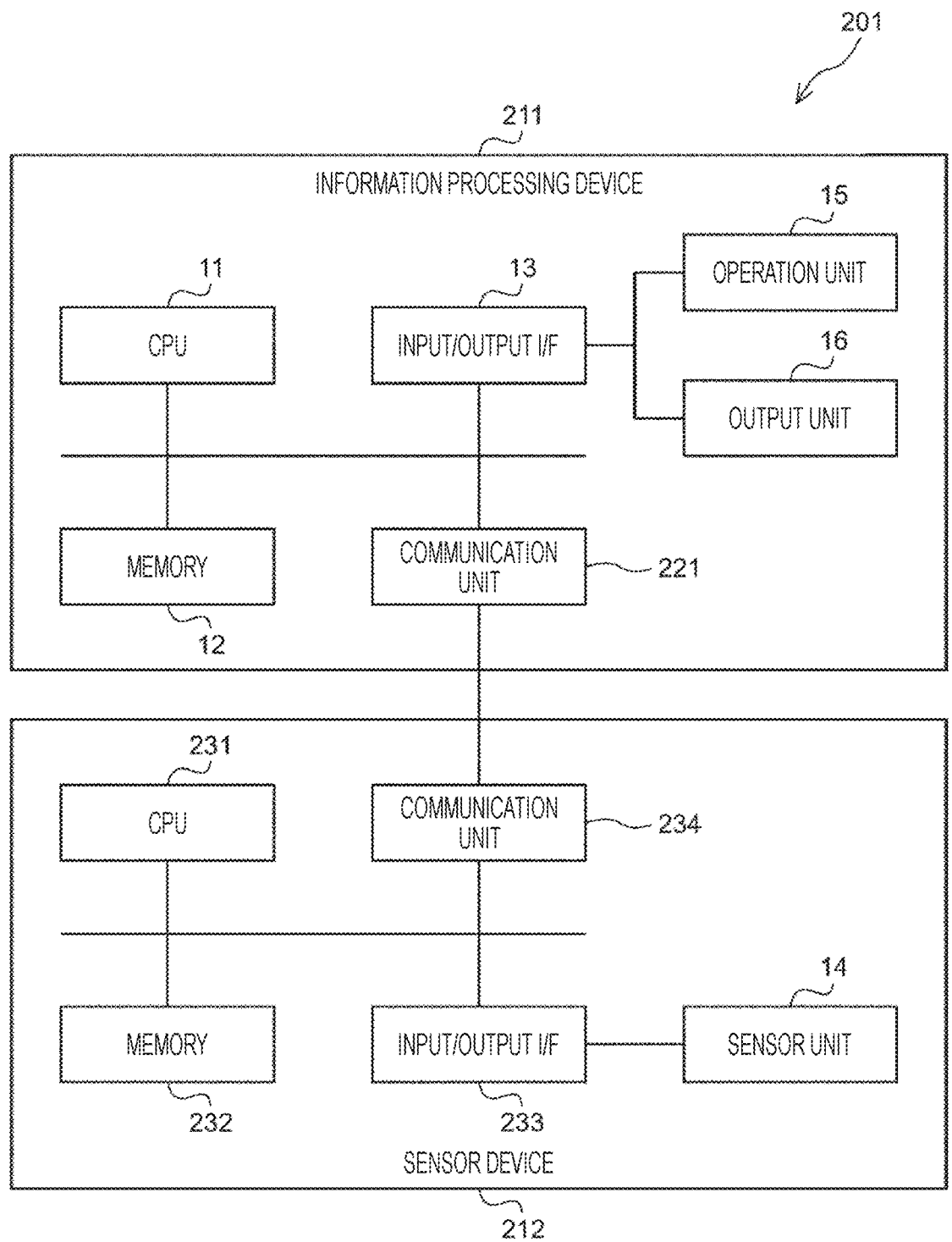
FIG. 22 is a block diagram illustrating a configuration example of an information processing system to which the present technology is applied.

FIG. 22 illustrates a configuration example of an information processing system 201 to which the present technology is applied. Note that, in the drawing, portions corresponding to those in FIG. 1 are assigned with the same reference signs, and the description thereof is omitted as appropriate.

The information processing system 201 is different from the information processing device 1 in FIG. 1 in that a sensor unit 14 is separated from an information processing device 211.

Specifically, the information processing system 201 includes the information processing device 211 and a sensor device 212.

The information processing device 211 is different from the information processing device 1 in that a communication unit 221 is added and the sensor unit 14 is deleted.

The communication unit 221 is connected to a bus. The communication unit 221 communicates with the sensor device 212 by a predetermined communication method. Note that a communication method of the communication unit 221 may be any method, and may be either wired communication or wireless communication.

The sensor device 212 includes the sensor unit 14, a CPU 231, a memory 232, an input/output I/F 233, and a communication unit 234. The CPU 231, the memory 232, the input/output I/F 233, and the communication unit 234 are connected to each other via a bus. The sensor unit 14 is connected to the input/output I/F 233.

The CPU 231 executes various types of processing of the sensor device 212 and controls each unit.

The memory 232 includes a nonvolatile memory and a volatile memory, and stores data, programs, and the like necessary for processing of the sensor device 212.

The input/output I/F 233 is an interface that connects various devices and inputs and outputs data and the like between the CPU 231, the memory 232, and the communication unit 234 and the various devices.

The communication unit 234 communicates with the communication unit 221 by a communication method corresponding to the communication unit 221 of the information processing device 211.

As described above, in the information processing system 201, the information processing device 211 and the sensor device 212 are separated. Therefore, the flexibility of the installation place of the sensor device 212 (sensor unit 14) is improved. For example, the sensor device 212 can be mounted on the user or installed in a surrounding environment such as a wall or a pole.

Note that, for example, two or more sensor devices 212 may be included.

Furthermore, for example, a part of the sensor unit 14 may be included in the information processing device 211.

3. Modification

Hereinafter, a modification of the embodiments of the present technology described above will be described.

For example, the set designated range does not necessarily need to be displayed. For example, in a case where the designated range is set to a door handle of the vehicle 101, the designated range may not be displayed and an operation for the door handle may be performed by the next operation by the user.

The present technology can be applied to a device that implements XR other than an HMD. For example, the present technology can be applied to projection AR (augmented reality), a large display, and the like.

4. Others

<Configuration Example of Computer>

The above-described series of processing can be executed by hardware or software. In a case where a series of processing is executed by software, a program included in the software is installed on a computer. Here, examples of the computer include a computer incorporated in dedicated hardware, and for example, a general-purpose personal computer that can execute various functions by installing various programs.

Figure 23:
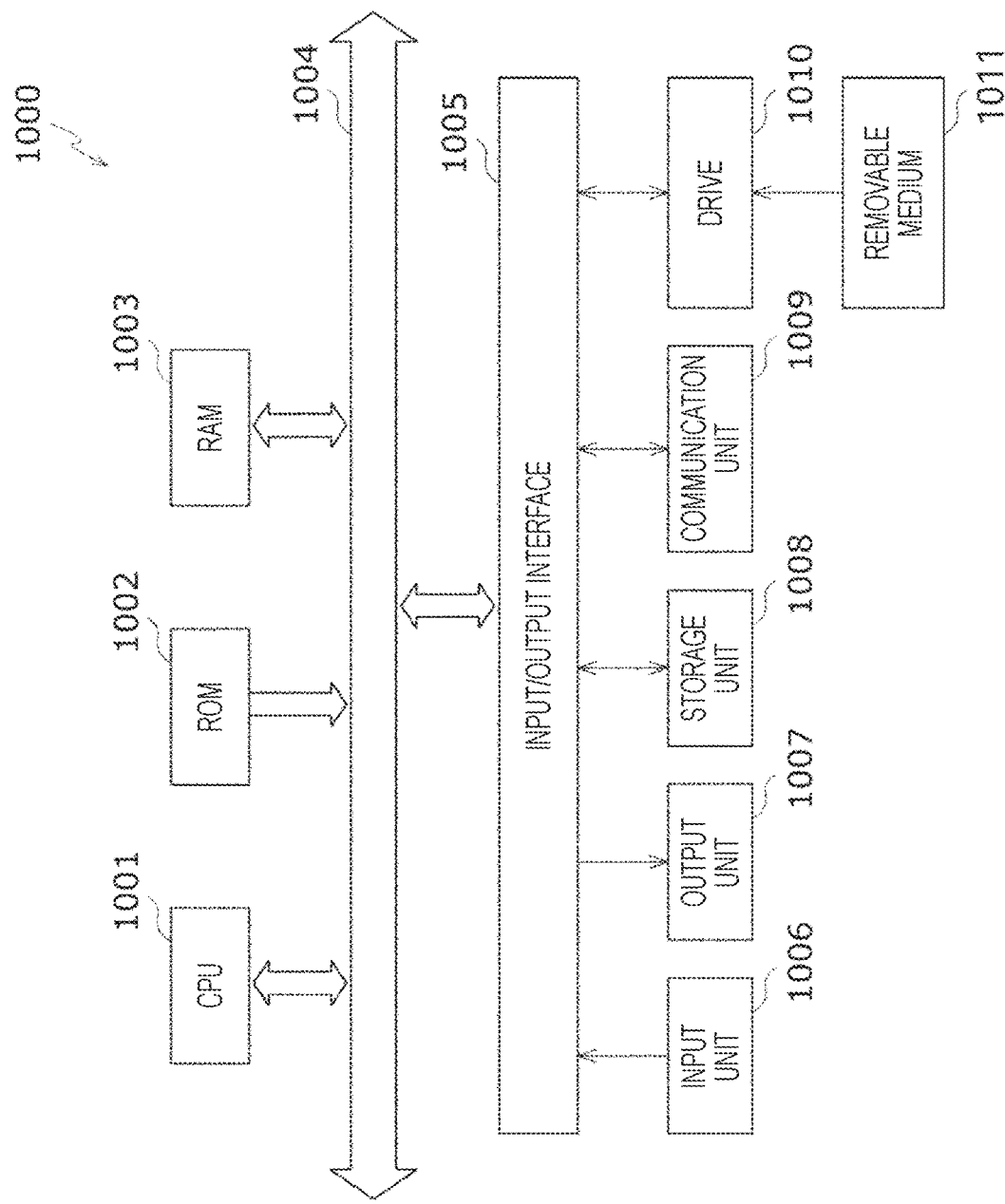
FIG. 23 is a block diagram illustrating a configuration example of a computer.

FIG. 23 is a block diagram illustrating a configuration example of hardware of a computer that executes the above-described series of processing by a program.

In a computer 1000, a central processing unit (CPU) 1001, a read only memory (ROM) 1002, and a random access memory (RAM) 1003 are mutually connected by a bus 1004.

Moreover, an input/output interface 1005 is connected to the bus 1004. An input unit 1006, an output unit 1007, a storage unit 1008, a communication unit 1009, and a drive 1010 are connected to the input/output interface 1005.

The input unit 1006 includes an input switch, a button, a microphone, an imaging element and the like.

The output unit 1007 includes a display, a speaker, and the like. The storage unit 1008 includes a hard disk, a nonvolatile memory, and the like. The communication unit 1009 includes a network interface and the like. The drive 1010 drives a removable medium 1011 such as a magnetic disk, an optical disc, a magneto-optical disk, or a semiconductor memory.

In the computer 1000 configured as described above, the above-described series of processing is performed, for example, by the CPU 1001 loading a program stored in the storage unit 1008 into the RAM 1003 via the input/output interface 1005 and the bus 1004, and executing the program.

The program executed by the computer 1000 (CPU 1001) can be provided, for example, by being recorded in the removable medium 1011 as a package medium or the like. Furthermore, the program can be provided via a wired or wireless transmission medium such as a local area network, the Internet, or digital satellite broadcasting.

In the computer 1000, the program can be installed in the storage unit 1008 via the input/output interface 1005 by mounting the removable medium 1011 on the drive 1010. Furthermore, the program can be received by the communication unit 1009 via a wired or wireless transmission medium and installed in the storage unit 1008. Alternatively, the program can be preinstalled in the ROM 1002 or the storage unit 1008.

Note that the program executed by the computer may be a program in which processing is performed in time series in the order described in the present specification or may be a program in which processing is performed in parallel or at necessary timing such as when a call is made.

Furthermore, in the present specification, the system means a set of a plurality of components (devices, modules (parts), or the like) without regard to whether or not all the components are in the same housing. Therefore, a plurality of devices housed in separate housings and connected via a network, and one device housing a plurality of modules in one housing are both systems.

Moreover, the embodiments of the present technology are not limited to the above-described embodiments, and a variety of modifications can be made without departing from the gist of the present technology.

For example, the present technology can have a cloud computing configuration in which one function is shared and processed in cooperation by a plurality of devices via a network.

Furthermore, each step described in the flowchart described above may be executed by one device, or can be executed by a plurality of devices in a shared manner.

Moreover, in a case where a plurality of pieces of processing is included in one step, the plurality of pieces of processing included in the one step can be executed by one device or executed by a plurality of devices in a shared manner.

<Combination Examples of Configurations>

The present technology can also have the following configurations.

(1)
An information processing device including:
an object recognition unit that recognizes a state of a target object that is a real object or a virtual object that exists in a field of view of a user;
an operation body recognition unit that recognizes a state of an operation body that is a real object or a virtual object used by the user for setting a designated range for the target object; and
a designated range setting unit that sets the designated range on a basis of at least one of a state of the target object or a state of the operation body.

(2)
The information processing device according to the (1),
in which the designated range setting unit sets the designated range on a basis of a distance between the operation body and the target object.

(3)
The information processing device according to the (2),
in which the designated range setting unit reduces the designated range as a distance between the operation body and the target object decreases.

(4)
The information processing device according to the (3),
in which the designated range setting unit sets a range in which the designated range can be changed on a basis of a distance between the user and the target object.

(5)
The information processing device according to any one of the (2) to (4),
in which the designated range setting unit moves a position of the designated range in the target object in a depth direction with respect to the user on a basis of a distance between the operation body and the target object.

(6)
The information processing device according to any one of the (1) to (5),
in which the designated range setting unit sets the designated range on a basis of a shape of the operation body.

(7)
The information processing device according to the (6),
in which the designated range setting unit sets the designated range on a basis of a distance between at least two predetermined points of the operation body.

(8)
The information processing device according to any one of the (1) to (7),
in which the designated range setting unit sets the designated range on a basis of a posture of the operation body.

(9)
The information processing device according to any one of the (1) to (8),
in which the designated range setting unit sets the designated range on a basis of a distance between a plurality of the operation bodies.

(10)
The information processing device according to any one of the (1) to (9),
in which the designated range setting unit sets the designated range on a basis of a stationary time of the operation body.

(11)
The information processing device according to any one of the (1) to (10),
in which the designated range setting unit sets the designated range of default on a basis of the designated range set by another user.

(12)
The information processing device according to any one of the (1) to (11),
in which the designated range setting unit sets the designated range further on a basis of a moving speed of the target object.

(13)
The information processing device according to any one of the (1) to (12), further including
a user state recognition unit that recognizes a state of the user,
in which the designated range setting unit sets a range in which the designated range is reduced on a basis of at least one of a state of the user or a state of the operation body.

(14)
The information processing device according to the (13),
in which the designated range setting unit sets a range in which the designated range is reduced on a basis of a position to which the user pays attention or a position indicated by the user.

(15)
The information processing device according to any one of the (1) to (12), further including
a user state recognition unit that recognizes a state of the user,
in which the designated range setting unit selects the target object from among objects in a field of view of a user on a basis of at least one of a state of the user or a state of the operation body.

(16)
The information processing device according to the (15),
in which the designated range setting unit selects the target object on a basis of a position to which the user pays attention or a position indicated by the user.

(17)
The information processing device according to any one of the (1) to (16) further including
an output control unit that controls display of the designated range by projection of video in a field of view of the user or onto the target object.

(18)
The information processing device according to the (17),
in which the output control unit sets the designated range in a display mode different from a surrounding.

(19)
The information processing device according to any one of the (1) to (18),
in which the operation body is a hand of the user.
(20)
An information processing method performed by an information processing device, including:
recognizing a state of a target object that is a real object or a virtual object that exists in a field of view of a user;
recognizing a state of an operation body that is a real object or a virtual object used by the user for setting a designated range for the target object; and
setting the designated range on a basis of at least one of a state of the target object or a state of the operation body.
Note that the effects described herein are merely examples and are not limited, and other effects may be provided.

REFERENCE SIGNS LIST

1 Information processing device
11 CPU
14 Sensor unit
15 Operation unit
16 Output unit
51 Information processing unit
61 Imaging unit
62 Distance sensor
63 Gyro sensor
64 Acceleration sensor
65 Orientation sensor
71 Object recognition unit
72 Operation body recognition unit
73 User state recognition unit
74 Designated range setting unit
75 Output control unit
201 Information processing system
211 Information processing device
212 Sensor device
231 CPU

The invention claimed is:
1. An information processing device comprising:
circuitry configured to:
recognize a state of a target object that is a real object or a virtual object that exists in a field of view of a user;
recognize a state of an operation body that is a real object or a virtual object used by the user for setting a designated range for the target object; and
set the designated range on a basis of at least one of a state of the target object or a state of the operation body,
wherein the state of the operation body includes a stationary time of the operation body,
wherein the designated range is set to a first area of the target object on a basis of the stationary time of the operation body being more than a threshold value and the designated range is set to a second area of the target object smaller than the first area on a basis of the stationary time of the operation body being less than the threshold value, and
wherein the circuitry is further configured to set the designated range in a display mode different from a surrounding.
2. The information processing device according to claim 1,
wherein the circuitry is further configured to set the designated range on a basis of a distance between the operation body and the target object.
3. The information processing device according to claim 2,
wherein the circuitry is further configured to reduce the designated range as a distance between the operation body and the target object decreases.
4. The information processing device according to claim 3,
wherein the circuitry is further configured to set a range in which the designated range can be changed on a basis of a distance between the user and the target object.
5. The information processing device according to claim 2,
wherein the circuitry is further configured to move a position of the designated range in the target object in a depth direction with respect to the user on a basis of a distance between the operation body and the target object.
6. The information processing device according to claim 1,
wherein the circuitry is further configured to set the designated range on a basis of a shape of the operation body.
7. The information processing device according to claim 6,
wherein the circuitry is further configured to set the designated range on a basis of a distance between at least two predetermined points of the operation body.
8. The information processing device according to claim 1,
wherein the circuitry is further configured to set the designated range on a basis of a posture of the operation body.
9. The information processing device according to claim 1,
wherein the circuitry is further configured to set the designated range on a basis of a distance between a plurality of the operation bodies.
10. The information processing device according to claim 1,
wherein the circuitry is further configured to set the designated range as a default designated range on a basis of the designated range set by another user.
11. The information processing device according to claim 1,
wherein the circuitry is further configured to set the designated range further on a basis of a moving speed of the target object.
12. The information processing device according to claim 1, further comprising
a user state recognition unit that recognizes a state of the user,
wherein the circuitry is further configured to set a range in which the designated range is reduced on a basis of at least one of a state of the user or a state of the operation body.
13. The information processing device according to claim 12,
wherein the circuitry is further configured to set a range in which the designated range is reduced on a basis of a position to which the user pays attention or a position indicated by the user.
14. The information processing device according to claim 1, wherein the circuitry is further configured to:

recognize a state of the user; and select the target object from among objects in a field of view of a user on a basis of at least one of a state of the user or a state of the operation body.

15. The information processing device according to claim 14, wherein the circuitry is further configured to select the target object on a basis of a position to which the user pays attention or a position indicated by the user.

16. The information processing device according to claim 1, wherein the circuitry is further configured to control display of the designated range by projection of video in a field of view of the user or onto the target object.

17. The information processing device according to claim 1, wherein the operation body is a hand of the user.

18. An information processing method performed by an information processing device, comprising:

recognizing a state of a target object that is a real object or a virtual object that exists in a field of view of a user;

recognizing a state of an operation body that is a real object or a virtual object used by the user for setting a designated range for the target object; and setting the designated range on a basis of at least one of a state of the target object or a state of the operation body, wherein the state of the operation body includes a stationary time of the operation body, wherein the designated range is set to a first area of the target object on a basis of the stationary time of the operation body being more than a threshold value and the designated range is set to a second area of the target object smaller than the first area on a basis of the stationary time of the operation body being less than the threshold value, and wherein the designated range is set in a display mode different from a surrounding.

19. A non-transitory computer-readable medium having embodied thereon a program, which when executed by a computer causes the computer to execute an information processing method, the method comprising:

recognizing a state of a target object that is a real object or a virtual object that exists in a field of view of a user;

recognizing a state of an operation body that is a real object or a virtual object used by the user for setting a designated range for the target object; and setting the designated range on a basis of at least one of a state of the target object or a state of the operation body, wherein the state of the operation body includes a stationary time of the operation body, wherein the designated range is set to a first area of the target object on a basis of the stationary time of the operation body being more than a threshold value and the designated range is set to a second area of the target object smaller than the first area on a basis of the stationary time of the operation body being less than the threshold value, and wherein the designated range is set in a display mode different from a surrounding.

20. The information processing device according to claim 1, wherein the designated range is set to a third area of the target object larger than the second area on a basis of the stationary time of the operation body being more than a second threshold value.

21. An information processing device comprising:
circuitry configured to:

recognize a state of a target object that is a real object or a virtual object that exists in a field of view of a user;

recognize a state of an operation body that is a real object or a virtual object used by the user for setting a designated range for the target object;

set the designated range on a basis of at least one of a state of the target object or a state of the operation body; and set the designated range as a default designated range on a basis of the designated range set by another user, wherein the state of the operation body includes a stationary time of the operation body, and wherein the designated range is set to a first area of the target object on a basis of the stationary time of the operation body being more than a threshold value and the designated range is set to a second area of the target object smaller than the first area on a basis of the stationary time of the operation body being less than the threshold value.

22. An information processing method performed by an information processing device, comprising:

recognizing a state of a target object that is a real object or a virtual object that exists in a field of view of a user;

recognizing a state of an operation body that is a real object or a virtual object used by the user for setting a designated range for the target object;

setting the designated range on a basis of at least one of a state of the target object or a state of the operation body; and setting the designated range as a default designated range on a basis of the designated range set by another user, wherein the state of the operation body includes a stationary time of the operation body, and wherein the designated range is set to a first area of the target object on a basis of the stationary time of the operation body being more than a threshold value and the designated range is set to a second area of the target object smaller than the first area on a basis of the stationary time of the operation body being less than the threshold value.

23. A non-transitory computer-readable medium having embodied thereon a program, which when executed by a computer causes the computer to execute an information processing method, the method comprising:

recognizing a state of a target object that is a real object or a virtual object that exists in a field of view of a user;

recognizing a state of an operation body that is a real object or a virtual object used by the user for setting a designated range for the target object;

setting the designated range on a basis of at least one of a state of the target object or a state of the operation body; and setting the designated range as a default designated range on a basis of the designated range set by another user, wherein the state of the operation body includes a stationary time of the operation body, and wherein the designated range is set to a first area of the target object on a basis of the stationary time of the operation body being more than a threshold value and the designated range is set to a second area of the target object smaller than the first area on a basis of the stationary time of the operation body being less than the threshold value.

* * * * *